United States Patent
Schadow et al.

(10) Patent No.: US 10,974,381 B2
(45) Date of Patent: Apr. 13, 2021

(54) SYSTEM AT LEAST COMPRISING AN ELECTRONICALLY COMMUTATED ELECTRIC MOTOR OF A DEFINED CONSTRUCTION SIZE, AND A RECHARGEABLE BATTERY OF AT LEAST ONE VOLTAGE CLASS

(71) Applicant: Robert Bosch GmbH, Stuttgart (DE)

(72) Inventors: Joachim Schadow, Stuttgart (DE); Florian Esenwein, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 853 days.

(21) Appl. No.: 15/315,843

(22) PCT Filed: Apr. 7, 2015

(86) PCT No.: PCT/EP2015/057499
§ 371 (c)(1),
(2) Date: Dec. 2, 2016

(87) PCT Pub. No.: WO2015/188960
PCT Pub. Date: Dec. 17, 2015

(65) Prior Publication Data
US 2017/0106520 A1  Apr. 20, 2017

(30) Foreign Application Priority Data
Jun. 10, 2014 (DE) .................. 10 2014 211 046

(51) Int. Cl.
*B25F 3/00* (2006.01)
*B25F 5/00* (2006.01)

(52) U.S. Cl.
CPC . *B25F 3/00* (2013.01); *B25F 5/00* (2013.01)

(58) Field of Classification Search
CPC ...... B25F 3/00; B25F 5/00; B25F 5/02; B25F 5/029; B25F 1/00; B25F 1/02; B25F 1/04
(Continued)

(56) References Cited

U.S. PATENT DOCUMENTS 7,656,131 B2 * 2/2010 Embrey ............... H02J 7/0011
320/139
8,813,866 B2 * 8/2014 Suzuki ...................... B25F 5/00
173/2
(Continued)

FOREIGN PATENT DOCUMENTS

| CN | 1191917 C | 3/2005 |
|----|-----------|--------|
| CN | 101326703 A | 12/2008 |

(Continued)

OTHER PUBLICATIONS

Closed Loop vs. Open Loop Control, Dataforth, Retrieved online from URL https://www.dataforth.com/closed-loop-vs-open-loop-control.aspx on (Year: 2019).*
(Continued)

*Primary Examiner* — Valentin Neacsu
(74) *Attorney, Agent, or Firm* — Maginot, Moore & Beck LLP

(57) ABSTRACT

A system includes a first hand-held power tool, a second hand-held power tool, and a rechargeable battery of a voltage class. The first hand-held power tool includes a first interface for the rechargeable battery, an electronically commutated electric motor of a defined construction size, a first electronic unit configured to supply the electronically commutated electric motor with power, and a first switch element configured to activate the electronically commutated electric motor. The second hand-held power tool includes a second interface for the rechargeable battery, an electronically commutated electric motor of a defined construction size, a second electronic unit configured to supply the
(Continued)

electronically commutated electric motor with power, and a second switch element configured to activate the electronically commutated electric motor. The rechargeable battery is configured for contact with both the first interface and the second interface.

20 Claims, 26 Drawing Sheets

(58) Field of Classification Search
USPC .......... 173/217, 2, 46; 15/344, 328; 320/112
See application file for complete search history.

(56) References Cited

U.S. PATENT DOCUMENTS

| | | | | |
|---|---|---|---|---|
| 9,041,322 B2* | 5/2015 | Shimizu | ................... | B25F 5/02 318/139 |
| 2005/0073282 A1* | 4/2005 | Carrier | ................... | B25F 5/00 320/106 |
| 2005/0258801 A9* | 11/2005 | Johnson | ................... | B25F 5/02 320/110 |
| 2005/0270754 A1* | 12/2005 | Roehm | ................... | B25F 5/02 361/755 |
| 2006/0091858 A1* | 5/2006 | Johnson | ................... | B25F 5/00 320/128 |
| 2006/0112570 A1* | 6/2006 | Serdynski | ................. | B25F 5/00 30/392 |
| 2006/0119318 A1* | 6/2006 | Serdynski | ............... | H01M 2/34 320/114 |
| 2006/0267548 A1* | 11/2006 | Uehlein-Proctor | ....... | B25F 5/02 320/107 |
| 2006/0267556 A1* | 11/2006 | Uehlein-Proctor | ....... | B25F 5/00 320/132 |
| 2007/0103113 A1* | 5/2007 | Embrey | ................. | H02J 7/0011 320/112 |
| 2008/0003505 A1* | 1/2008 | Wuensch | .................. | B25F 5/02 429/303 |
| 2008/0309289 A1* | 12/2008 | White | .................. | H02J 7/0063 320/136 |
| 2010/0088843 A1* | 4/2010 | Reed | ..................... | A47L 9/2857 15/389 |
| 2011/0056177 A1* | 3/2011 | Goto | ........................ | B62M 6/55 56/14.7 |
| 2011/0197389 A1* | 8/2011 | Ota | ........................ | H02J 7/0045 15/339 |
| 2011/0198103 A1* | 8/2011 | Suzuki | ..................... | B25F 5/00 173/46 |
| 2011/0215767 A1* | 9/2011 | Johnson | .................... | H02J 7/00 320/136 |
| 2011/0241457 A1* | 10/2011 | Muller | ................. | A01D 34/902 310/50 |
| 2012/0145427 A1* | 6/2012 | Fuchs | ................... | B23B 45/001 173/216 |
| 2012/0318546 A1* | 12/2012 | Gray | ................... | H01M 2/1055 173/20 |
| 2013/0002175 A1* | 1/2013 | Shimizu | ................... | B25F 5/02 318/139 |
| 2013/0025893 A1* | 1/2013 | Ota | .......................... | H02J 1/10 173/2 |
| 2013/0027828 A1* | 1/2013 | Noda | ........................ | B25F 5/00 361/93.8 |
| 2013/0154584 A1* | 6/2013 | Sakaue | ..................... | G05F 1/46 323/234 |
| 2014/0014384 A1* | 1/2014 | Horie | ................... | H01M 2/105 173/217 |
| 2014/0090862 A1* | 4/2014 | Beutel | .................... | B25B 21/02 173/217 |
| 2014/0131059 A1* | 5/2014 | Verbrugge | .............. | B25F 5/008 173/217 |

FOREIGN PATENT DOCUMENTS

| | | |
|---|---|---|
| CN | 102256522 A | 11/2011 |
| CN | 103282165 A | 9/2013 |
| EP | 2 712 713 A1 | 4/2014 |
| JP | 2000-61868 A | 2/2000 |
| JP | 2011-161603 A | 8/2011 |
| JP | 2011-201003 A | 10/2011 |

OTHER PUBLICATIONS

Cordless Tools Buyers Guide, Published Dec. 13, 2013, retrieved online from URL https://www.familyhandyman.com/tools/power-tools/cordless-tools-buyers-guide/ (Year: 2013).*

International Search Report corresponding to PCT Application No. PCT/EP2015/057499, dated Jul. 3, 2015 (German and English language document) (7 pages).

* cited by examiner

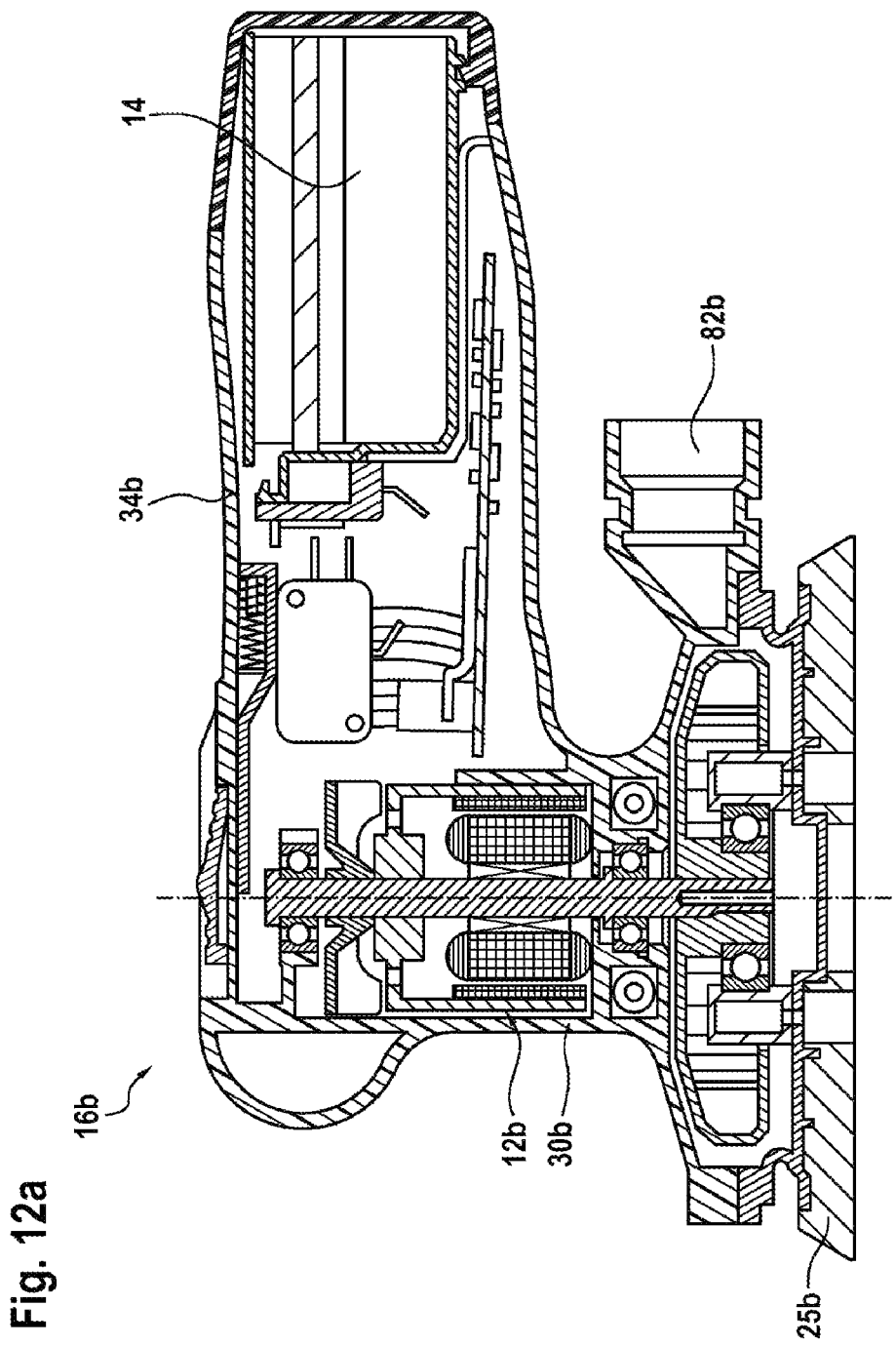

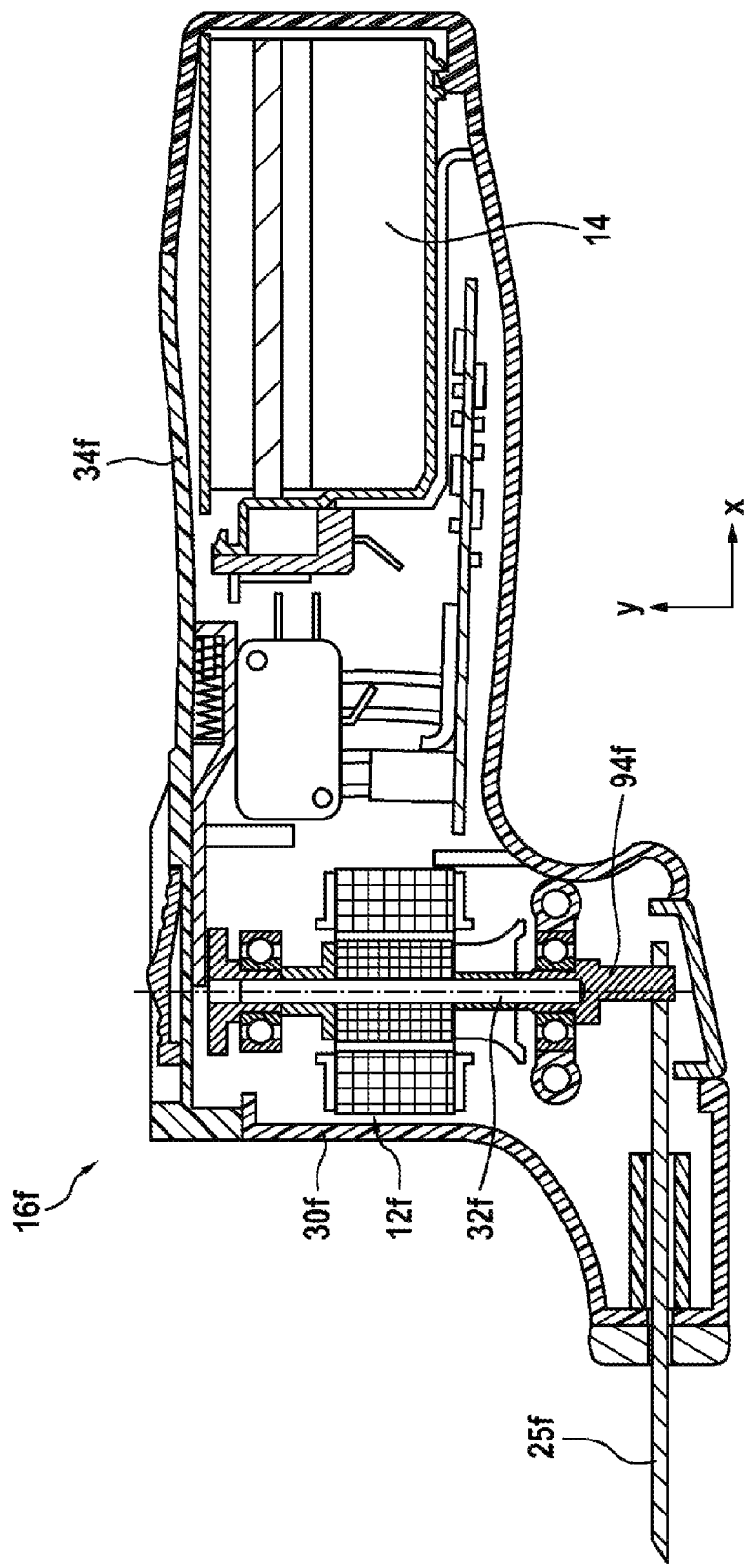

SYSTEM AT LEAST COMPRISING AN ELECTRONICALLY COMMUTATED ELECTRIC MOTOR OF A DEFINED CONSTRUCTION SIZE, AND A RECHARGEABLE BATTERY OF AT LEAST ONE VOLTAGE CLASS

This application is a 35 U.S.C. § 371 National Stage Application of PCT/EP2015/057499, filed on Apr. 7, 2015, which claims the benefit of priority to Serial No. DE 10 2014 211 046.7, filed on Jun. 10, 2014 in Germany, the disclosures of which are incorporated herein by reference in their entirety.

The disclosure relates to a system at least comprising an electronically commutated electric motor of a defined construction size and a rechargeable battery of at least one voltage class.

SUMMARY

The system according to the disclosure comprises at least one first hand-held power tool, which has at least one first interface, which can correspond with at least one rechargeable battery of a voltage class. "Correspond" is intended to be understood here as meaning in particular that a rechargeable battery is provided for supplying the hand-held power tool with electrical energy. The electrical energy may be transmitted by way of the interface of the hand-held power tool. The energy transmission may take place in a cable-bound or cableless manner. The cableless energy transmission may take place for example by way of inductive energy transmission.

The system also comprises at least one electronically commutated electric motor of a defined construction size. A construction size is intended to be understood here as meaning a length and a diameter. The length of the electronically commutated electric motor is defined on the basis of a package length. The diameter is formed by the diameter of a motor housing.

At least one first electronic unit is provided at least for controlling the electronically commutated electric motor in an open-loop and/or closed-loop manner. "Controlling in an open-loop manner" is intended to be understood as meaning in particular that the electronic unit provides an activation signal for the electronically commutated electric motor independently of a parameter of the electronically commutated electric motor. "Controlling in a closed-loop manner" is intended to be understood as meaning in particular that the electronic unit provides an activation signal for the electronically commutated electric motor in dependence on a parameter of the electronically commutated electric motor.

At least one first switching element activates the electronically commutated electric motor. "Activates" is intended to be understood as meaning that, when the switching element is actuated, the electronically commutated electric motor begins to rotate.

The system also comprises at least one second hand-held power tool, which has at least one second interface, which can correspond with the rechargeable battery of a voltage class. At least one second electronic unit is provided for controlling the electronically commutated electric motor in an open-loop and/or closed-loop manner. At least one second switching element is provided for activating the electronically commutated electric motor.

The system also comprises at least one rechargeable battery of a voltage class. It is proposed that the rechargeable battery of a voltage class either can correspond with the first interface of the first hand-held power tool or can correspond with the second interface of the second hand-held power tool. "Correspond" is intended to be understood here as meaning in particular "connect" or "attach". Advantageously, the rechargeable battery of a voltage class may consequently supply either the first hand-held power tool with electrical energy or the second hand-held power tool with electrical energy. This has the advantage that the system according to the disclosure can be handled flexibly.

Advantageous developments of the system according to the main claim are possible by the features that are presented in the subclaims.

In an advantageous embodiment, the electronically commutated electric motor is accommodated by a first housing part of the hand-held power tool.

Advantageously, the electronically commutated electric motor defines a first axis, which lies coaxially in relation to an output shaft. The output shaft is provided at least for driving a machining tool. Advantageously, the electronically commutated electric motor drives the output shaft directly. "Directly" is intended to be understood here as meaning in particular that the electronically commutated electric motor is connected to the machining tool by way of the output shaft without a conventional gear mechanism in between. As a result, a high level of efficiency is achieved while minimizing wear. The fact that the length of the electronically commutated electric motor defines a length of the first housing part means that a compact type of construction of the first housing part can be achieved, since installation space can be saved by omitting a conventional gear mechanism. This creates installation space in the hand-held power tool that is suitable for accommodating electric motors that are suitable for delivering high torques, and therefore can operate while dispensing with a gear mechanism as a direct drive.

In an advantageous embodiment, the electronic unit is at least partially accommodated by a second housing part. In this embodiment, the electronic unit is arranged at least in an x direction of the second housing part at least partially between the interface and the first housing part. The "x direction" is intended to be understood here as meaning in particular the main direction of extent of the second housing part. In this way, a compact type of construction of the second housing part is achieved.

In an advantageous embodiment, the rechargeable battery is at least partially integrated in the second housing part. It is particularly advantageous if the second housing part accommodates a large part of a battery length $l_B$. A "large part of a battery length $l_B$" is intended to be understood here as meaning in particular a proportion that corresponds to greater than 50% of the battery length $l_B$. As a result, a type of construction that is compact in the main direction of extent of the hand-held power tool is achieved.

Advantageously, the rechargeable battery with the second housing part defines a second axis, which lies coaxially in relation to the pushing-in direction of the rechargeable battery.

In a further advantageous embodiment, the rechargeable battery is at least partially arranged on the second housing part and a large part of the battery length $l_B$ lies outside the second housing part, the rechargeable battery with the second housing part forming a second common axis, which lies at an angle, in particular a right angle, to the pushing-in direction of the rechargeable battery. In this way, a further type of construction that is compact in the main direction of extent of the hand-held power tool is achieved.

In an advantageous embodiment, the first axis lies at an angle a to the second axis that lies between 60° and 120°, particularly between 80° and 100°, but with preference is approximately 90°.

In a further advantageous embodiment, the first axis lies at an angle a to the second axis that lies between 10° and 20°, particularly between 5° and 10°, but with preference is approximately 0°.

Advantageously, the second housing part is formed as a handle. Particularly advantageously, the second housing part serves as a handle. The term "handle" is intended to be understood here as meaning in particular a component around which at least one hand of an operator can be at least partially placed in order to guide the hand-held power tool.

Advantageously, a hand-held power tool is provided with a mechanical interface, which allows the hand-held power tool to be connected to the rechargeable battery or allows the connection to be released again. Consequently, the rechargeable battery is exchangeable, which makes flexible handling of the system possible.

Advantageously, the switching element is arranged in the second housing part, it being possible for the switching element to be configured as a switching slide, as a dead man's switch, as an accelerating switch or as an arresting switch. However, it is also conceivable that the switching element is configured as an electronic switch, as a sensor switch or the like. Multiple switching elements may form a switching system that can be flexibly selected from.

In an advantageous embodiment of the electronically commutated electric motor, the electronically commutated electric motor has a length $l_2$, which lies between 12 and 30 mm, particularly between 15 and 25 mm, but with preference between 18 and 24 mm. Furthermore, in this embodiment the electronically commutated electric motor has a diameter $d_1$, which lies between 30 and 50 mm, particularly between 35 and 44 mm, but with preference is 38 mm. In this way, a powerful hand-held power tool combined with a compact type of construction of the first housing part is achieved.

In a further advantageous embodiment of the electronically commutated electric motor, the electronically commutated electric motor has a length $l_2$, which lies between 10 and 30 mm, particularly between 15 and 25 mm, but with preference is 20 mm. Furthermore, in this embodiment the electronically commutated electric motor has a diameter $d_2$, which lies between 30 and 50 mm, particularly between 35 and 45 mm, but with preference is 44 mm. In this way, a powerful hand-held power tool combined with a compact type of construction of the first housing part is achieved.

In a further advantageous embodiment of the electronically commutated electric motor, the electronically commutated electric motor has a length $l_3$, which lies between 10 and 35 mm, particularly between 15 and 30 mm, but with preference is 26 mm. Furthermore, in this embodiment the electronically commutated electric motor has a diameter $d_3$, which lies between 40 and 60 mm, particularly between 45 and 55 mm, but with preference is 50 mm. In this way, a powerful hand-held power tool combined with a compact type of construction of the first housing part is achieved.

Advantageously, the electronically commutated electric motor may be formed as an internal-rotor motor or as an external-rotor motor. If the electronically commutated electric motor is an internal-rotor motor, high rotational speeds and a high power density are achievable. If the electronically commutated electric motor is an external-rotor motor, the electromotive drive is robustly designed and can deliver high torques from a standstill. Such a drive is accordingly particularly suitable for applications in which high torques are required in particular at low rotational speeds.

Advantageously, the electronically commutated electric motor has a rotor and a sensor element. The sensor element is advantageously provided for ascertaining an angular position of the rotor, which is evaluated by the electronic unit. This allows particularly advantageously a commutation to take place and the required torque of the electronically commutated electric motor to be produced. However, it is also conceivable that the commutation takes place without a sensor.

In a particularly advantageous embodiment, a length of the first housing part lies between 50 and 150 mm, in particular between 80 and 120 mm. With particular preference, however, the length of the first housing part is 100 mm. This is realized by the compact type of construction of the electronically commutated electric motor, which decisively defines the length of the first housing part.

Advantageously, the electronic unit is connected to the electronically commutated electric motor. This advantageously allows at least one parameter concerning the electronically commutated electric motor to be monitored. The parameter may be a rotational speed, a current and/or a voltage of the electronically commutated electric motor. By means of a setpoint-value/actual-value comparison of at least one value of the parameter which concerns the electronically commutated electric motor, the electronic unit calculates at least one activation signal for the electronically commutated electric motor.

Advantageously, the electronic unit is connected to an internal switch. An internal switch is intended to be understood here as meaning a switch that is activated by actuation of the external switching element.

Advantageously, at least one parameter concerning the internal switch can thereby be monitored. The parameter may be a short-circuit current, which flows by way of a switching contact. By means of a setpoint-value/actual-value comparison of at least one value of the parameter which concerns the internal switch, the electronic unit calculates at least one activation signal for the electronically commutated electric motor.

Advantageously, the electronic unit may be connected to the rechargeable battery. This advantageously allows at least one parameter concerning the rechargeable battery to be monitored. The parameter is at least a capacity of the rechargeable battery and/or an overload state of the rechargeable battery. By means of a setpoint-value/actual-value comparison of at least one value of the parameter which concerns the rechargeable battery, the electronic unit calculates at least one activation signal for the electronically commutated electric motor.

With preference, the battery voltage lies in a range between 3.6 and 42 V, in particular between 7.2 and 18 V. With particular preference, the battery voltage is however 10.8 V. The values of the battery voltage do not take into account possible battery voltage fluctuations.

In order that the electronically commutated electric motor can be operated at an optimum operating point or can operate efficiently, in an advantageous embodiment it is possible to switch over between an eco mode and a boost mode.

An "eco mode" is intended to be understood as meaning in particular a mode in which the electronically commutated electric motor is operated particularly efficiently. "Efficiently" is intended to be understood here as meaning that the electronically commutated electric motor is operated at an optimum operating point.

A "boost mode" is intended to be understood as meaning a mode in which the electronically commutated electric motor is operated particularly powerfully. The power requirement for the electronically commutated electric motor may in this case be time-limited and possibly lie in the overload range of the electronically commutated electric motor. The boost mode can be activated by way of a switch. In the boost mode, the power peak of the electronically commutated electric motor lies between 10% and 100%, particularly between 20% and 50%, but with preference at 33%. The time limitation of the boost mode lies between 0 and 5 min, particularly between 0 and 2.5 min. With preference, the time limitation of the boost mode lies between 30 s and 1 min.

With preference, the hand-held power tool is configured at least in one of the following embodiments:
  a. angle grinder
  b. eccentric grinder
  c. straight grinder
  d. oscillating multitool
  e. router
  f. electric scraper
  g. jigsaw
  h. circular saw
  i. riveter
  j. sander Further advantageous and expedient embodiments can be taken from the description of the figures and the drawings.

BRIEF DESCRIPTION OF THE DRAWINGS

The system according to the disclosure, the components according to the disclosure and the hand-held power tools according to the disclosure are shown in the drawings, in which:

FIG. 12a shows a partial view of a further embodiment of the second hand-held power tool according to the disclosure in a schematic representation, FIG. 15 shows a partial view of a sixth hand-held power tool according to the disclosure in a schematic representation.

DETAILED DESCRIPTION

Figure 1:
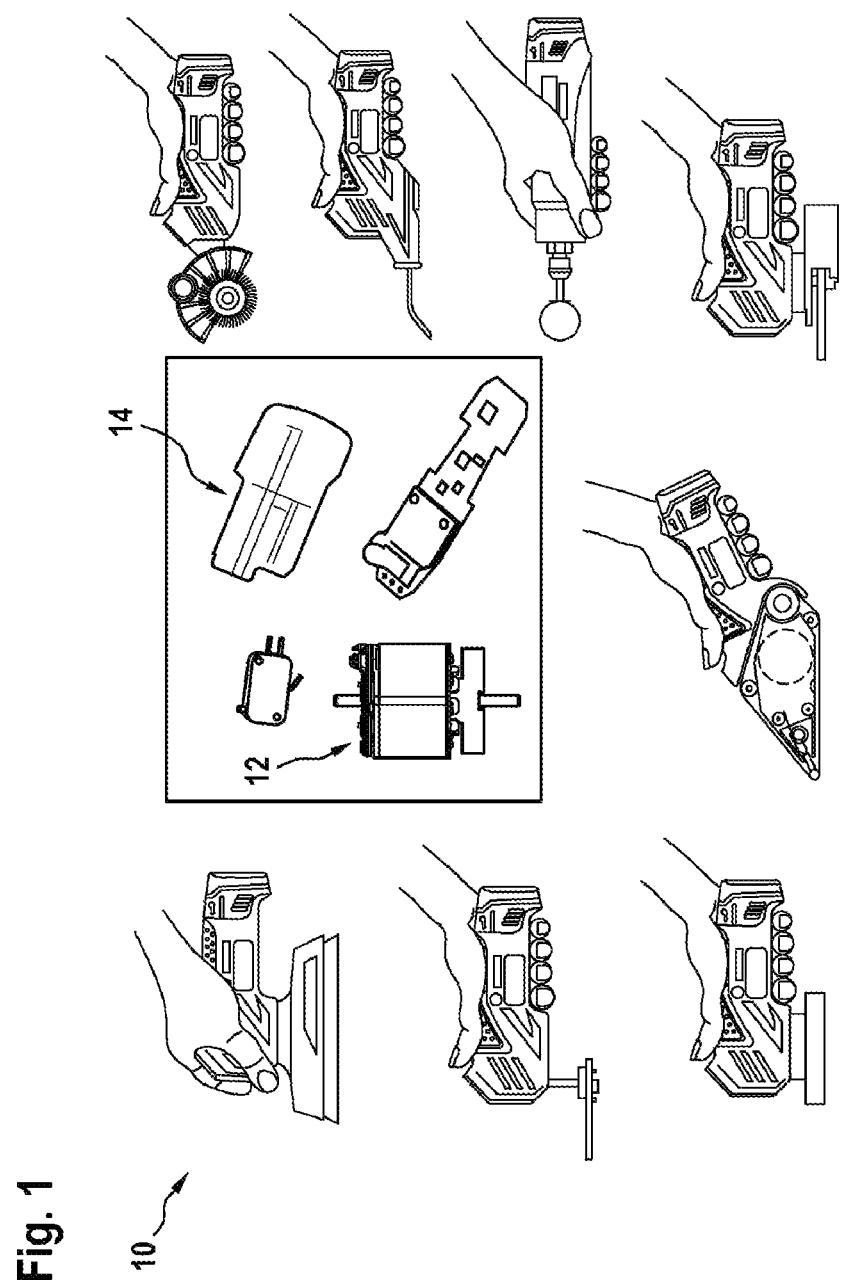
FIG. 1 shows the system according to the disclosure in a schematic representation.

The same reference numerals are used for the same components occurring in the different exemplary embodiments.

Figure 2:
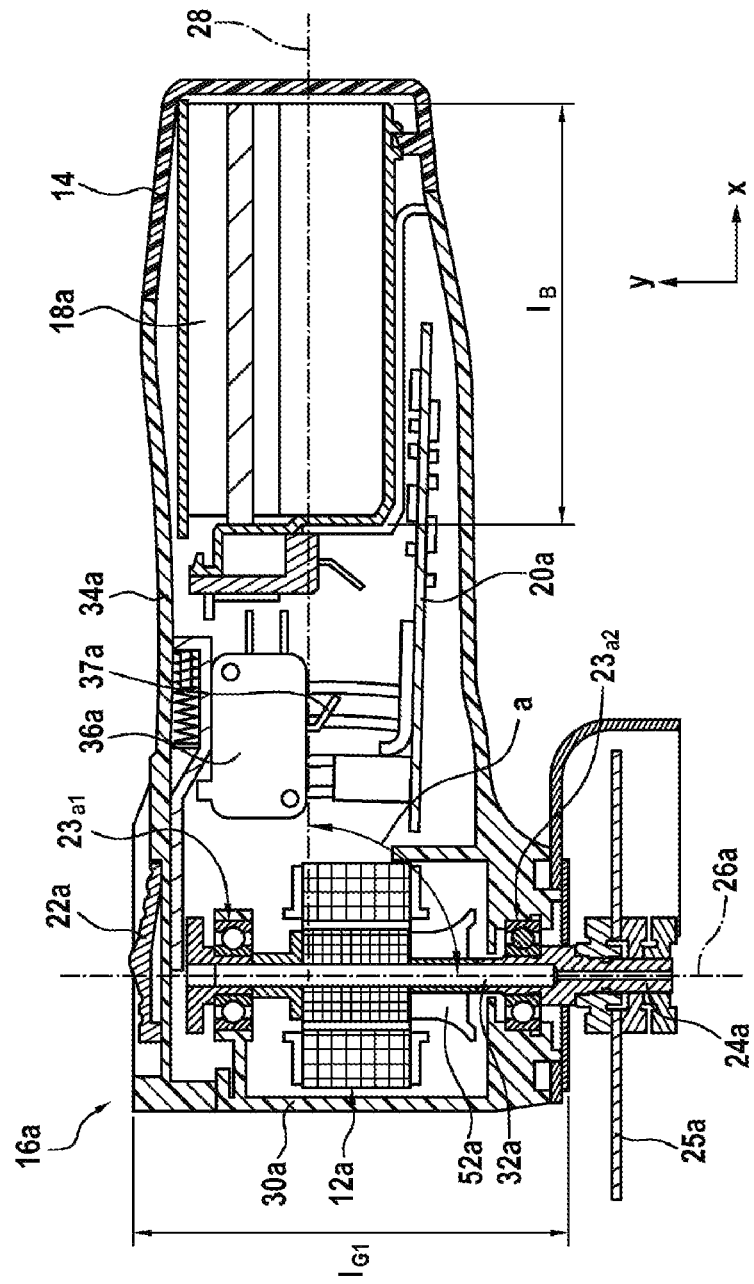
FIG. 2 shows a partial view of a first hand-held power tool according to the disclosure in a schematic representation.

FIG. 1 shows a system 10, which comprises an electronically commutated electric motor 12 of a defined construction size and a rechargeable battery 14 of a voltage class. The rechargeable battery 14 serves as an electrical energy source for various hand-held power tools 16a to 16j, but at least for a first hand-held power tool 16a, as represented in FIG. 2. In the exemplary embodiment in FIG. 2, the hand-held power tool 16a is formed as an angle grinder. In another embodiment, the hand-held power tool 16b to 16j is formed as an eccentric grinder, as a straight grinder, as an oscillating multitool, as a router, as an electric scraper, as a jigsaw, as a circular saw, as a riveter or as a sander. The first hand-held power tool 16a is provided with an electronically commutated electric motor 12a and a rechargeable battery 14. The electronically commutated electric motor 12a has within the limits of certain production tolerances a defined construction size. Arranged between the electronically commutated electric motor 12a and the rechargeable battery 14 is a first interface 18a for the rechargeable battery 14. An electronic unit 20a is provided for controlling the electronically commutated motor 12a in an open-loop and/or closed-loop manner. When a switching element 22a is actuated, the electronically commutated electric motor 12a is activated.

Figure 4:
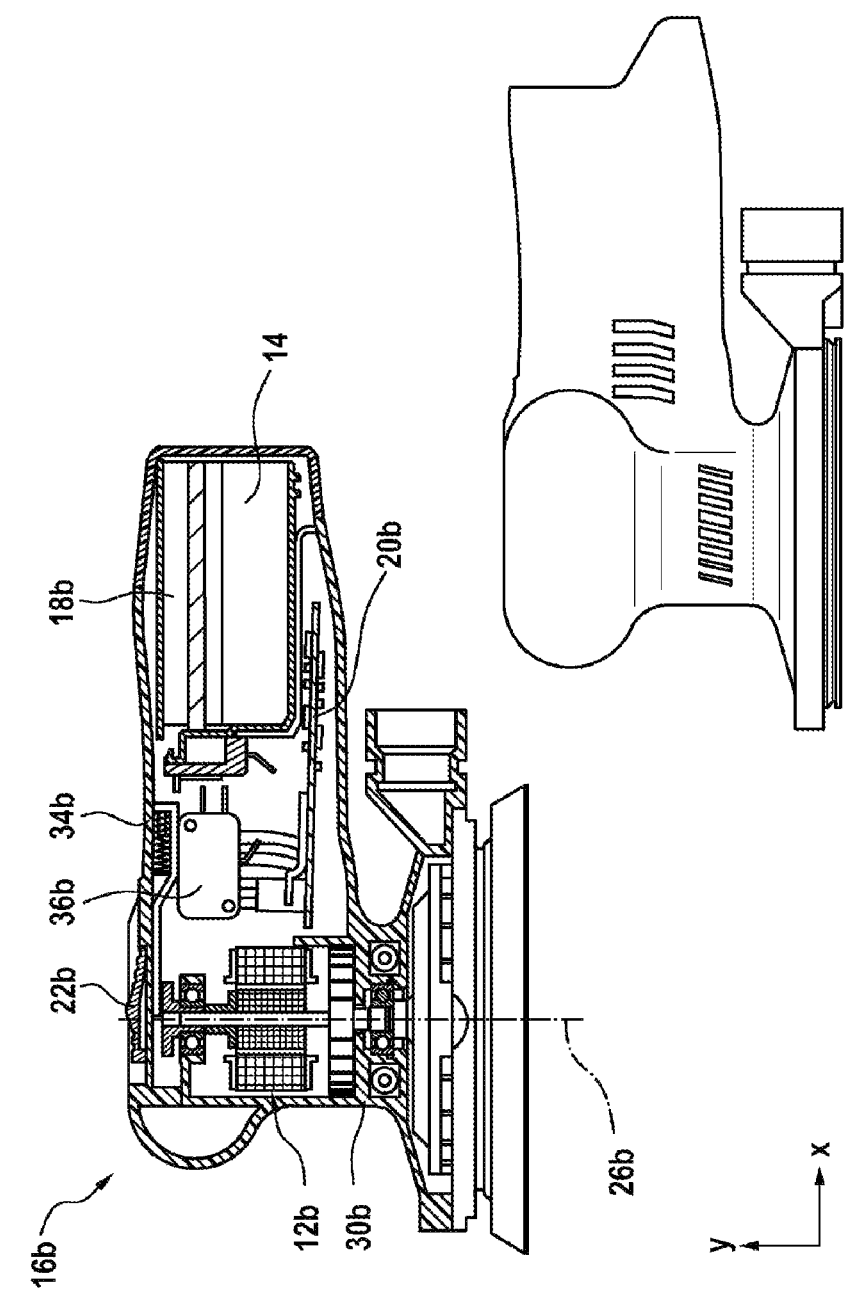
FIG. 4 shows a partial view of a second hand-held power tool according to the disclosure in a schematic representation.

A second hand-held power tool 16b is represented in FIG. 4 as an eccentric grinder. The second hand-held power tool 16b is provided with an electronically commutated electric motor 12b of a defined construction size and a rechargeable battery 14. Arranged between the electronically commutated electric motor 12b and the rechargeable battery 14 is a second interface 18b. A second electronic unit 20b is provided for controlling the electronically commutated electric motor 12b in an open-loop and/or closed-loop manner. When a second switching element 22b is actuated, the electronically commutated electric motor 12b is activated. The rechargeable battery 14 is intended both to be attachable to the first interface 18a and to serve as an energy source for the first hand-held power tool 16a, and to be attachable to the second interface 18b and to serve as an energy source for the second hand-held power tool 16b. That is to say that the rechargeable battery 14 may serve as an energy source for the hand-held power tools 16a to 16j of different types.

As evident in FIG. 2, the electronically commutated electric motor 12a is accommodated by a first housing part 30a. The electronically commutated electric motor 12a drives an output shaft 32a, which is likewise accommodated by the first housing part 30a. The output shaft 32a continues in a tool spindle 24a. The electronically commutated electric motor 12a drives the tool spindle 24a directly. Directly means that the electronically commutated electric motor 12a is connected to the tool spindle 24a without a conventional gear mechanism in between. On account of this structural design, the length of the electronically commutated electric motor 12a decisively defines the length $l_{G1}$ of the first housing part 30a.

That is to say that installation space can be saved by omitting a conventional gear mechanism. Requirements for installation space also arise at least as a result of the installation of motor bearings $23_{a1}$, $23_{a2}$.

Figure 3:
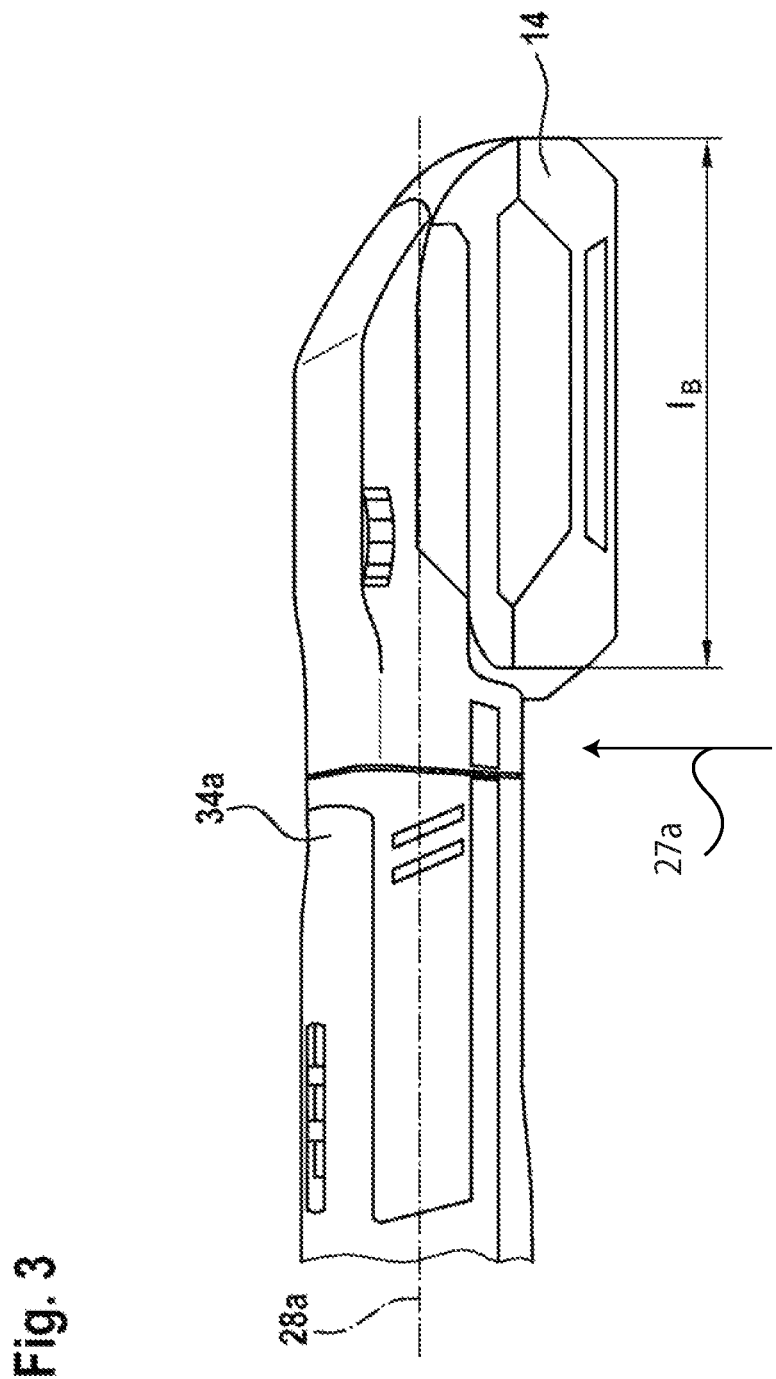
FIG. 3 shows a partial view of a second housing part in a schematic representation.

A machining tool 25a is arranged on the output side. In the exemplary embodiment in FIGS. 2 and 3, the machining tool 25a is for example a grinding, roughing or cut-off wheel. The electronically commutated electric motor 12a forms with the first housing part 30a a first axis 26a. The first axis 26a lies coaxially in relation to the output shaft 32a.

The electronic unit 20a is accommodated by a second housing part 34a. The second housing part 34a is arranged between the first housing part 30a and the rechargeable battery 14. The two housing parts 30a and 34a may be configured in one piece or as separate component units. As separate component units, the two housing parts may be screwed or welded or the like. The two housing parts may be connected to one another for rotation with respect to one another. The electronic unit 20a is arranged in the second housing part 34a in such a way that the geometrical dimension of the electronic unit 20a in the x direction of the second housing part 34a intersects with a large part of a battery length $l_B$ of the rechargeable battery 14 in the x direction of the second housing part 34a. This allows a maximum amount of installation space to be saved. In the exemplary embodiment in FIGS. 2 and 3, the proportion of the "large part of a battery length $l_B$" is greater than 50% of the battery length $l_B$.

Together with the second housing part 34a, the rechargeable battery 14 forms a second axis 28a. The second axis 28a in this case passes through the rechargeable battery 14 and extends along the second housing part 34a in an axial direction of the second housing part 34a. The axial direction is defined here as the x direction of the hand-held power tool 16a.

The two axes 26a and 28a are at an angle a to one another that lies between 60° and 120°, but particularly between 80° and 100°. With preference, the angle a between the first axis 26a and the second axis 28a is however approximately 90°. The figure given for the angle does not take into account any production tolerances.

In another advantageous embodiment, the two axes 26a and 28a are at an angle a to one another that lies between 10° and 20°, particularly between 5° and 10°, but with preference is approximately 0°.

In a further advantageous embodiment (FIG. 3), the rechargeable battery 14 is arranged on the second housing part 34a in such a way that a large part of the battery length $l_B$ lies outside the second housing part 34a. The second axis 28a lies here at an angle, in particular a right angle, in relation to the pushing-in direction 27a of the rechargeable battery 14.

The second housing part 34a is formed as a handle or serves as a handle. The term "handle" is intended to be understood here as meaning a component around which at least one hand of an operator can be at least partially placed in order to guide the hand-held power tool 16a.

In the exemplary embodiment, the first interface 18a is a mechanical interface. The mechanical interface establishes a mechanically fixed, but releasable connection between the two housing parts 30a, 34a. The first housing part 30a is connected to the second housing part 34a by way of the mechanical interface 18a securely, but such that it can be released manually or by a suitable tool.

When the switching element 22a is actuated, an internal switch 36a is actuated, switching on the electronic unit 20a. The electronic unit 20a supplies power to the electronically commutated electric motor 12a and controls it in a closed-loop and/or open-loop manner. The switching element 22a and the electronic unit 20a are accommodated by the second housing part 34a. In the exemplary embodiment in FIG. 2, the switching element 22a is configured as a switching slide.

However, it is also possible that the switching element 22a is configured as a dead man's switch, an accelerating switch or an arresting switch.

A switching system may comprise at least a sliding switch, a dead man's switch, an accelerating switch and an arresting switch.

Figure 5:
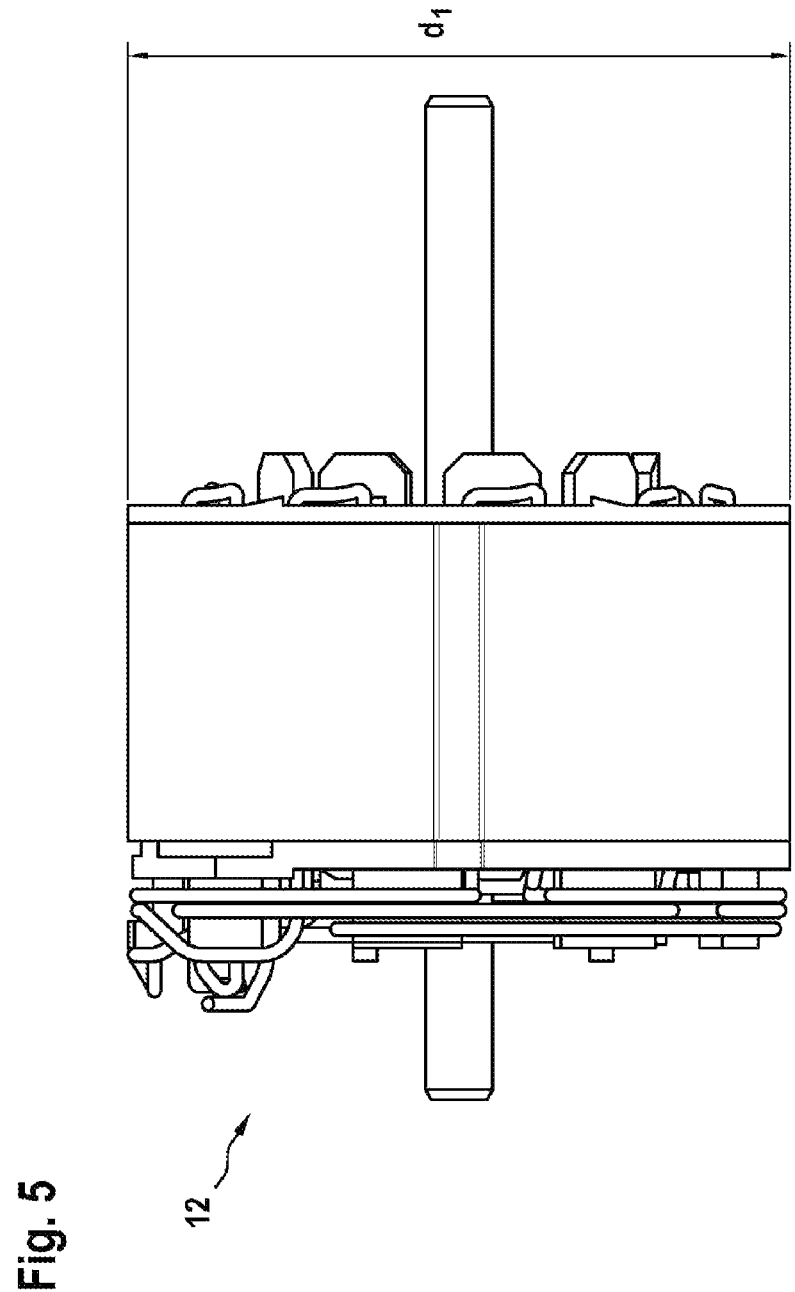
FIG. 5 shows a first electronically commutated electric motor of a defined construction size in a schematic representation.
Figure 5A:
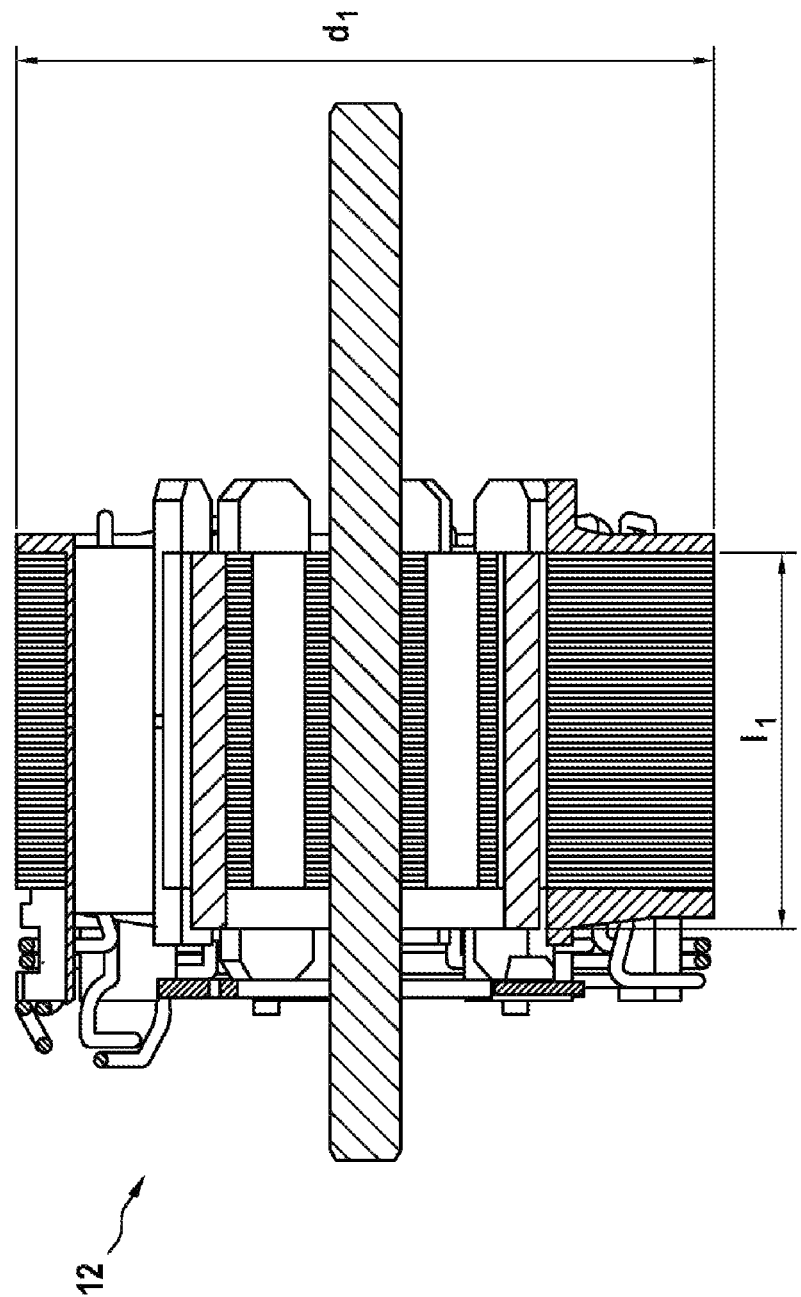
FIG. 5a shows a partial view of the first electronically commutated electric motor of a defined construction size in a schematic representation.

FIGS. 5 and 5a show an electronically commutated electric motor 12 of a first construction size. The electronically commutated electric motor 12 has a length $l_1$, which lies between 12 and 30 mm, particularly between 15 and 25 mm, but with preference between 18 and 24 mm. The electronically commutated electric motor 12 may be used with the length $l_1$ in the various hand-held power tools 16a to 16j. The values for the length $l_1$ of the electronically commutated electric motor 12 do not take into account any production tolerances occurring in the motor production process.

The electronically commutated electric motor 12 of the first construction size has a diameter $d_1$, which lies between 30 and 50 mm, particularly between 35 and 44 mm, but with preference is 38 mm. The electronically commutated electric motor 12 may be used with the diameter $d_1$ in the various hand-held power tools 16a to 16j. The values for the diameter $d_1$ of the electronically commutated electric motor 12a do not take into account any production tolerances occurring in the motor production process.

Figure 6:
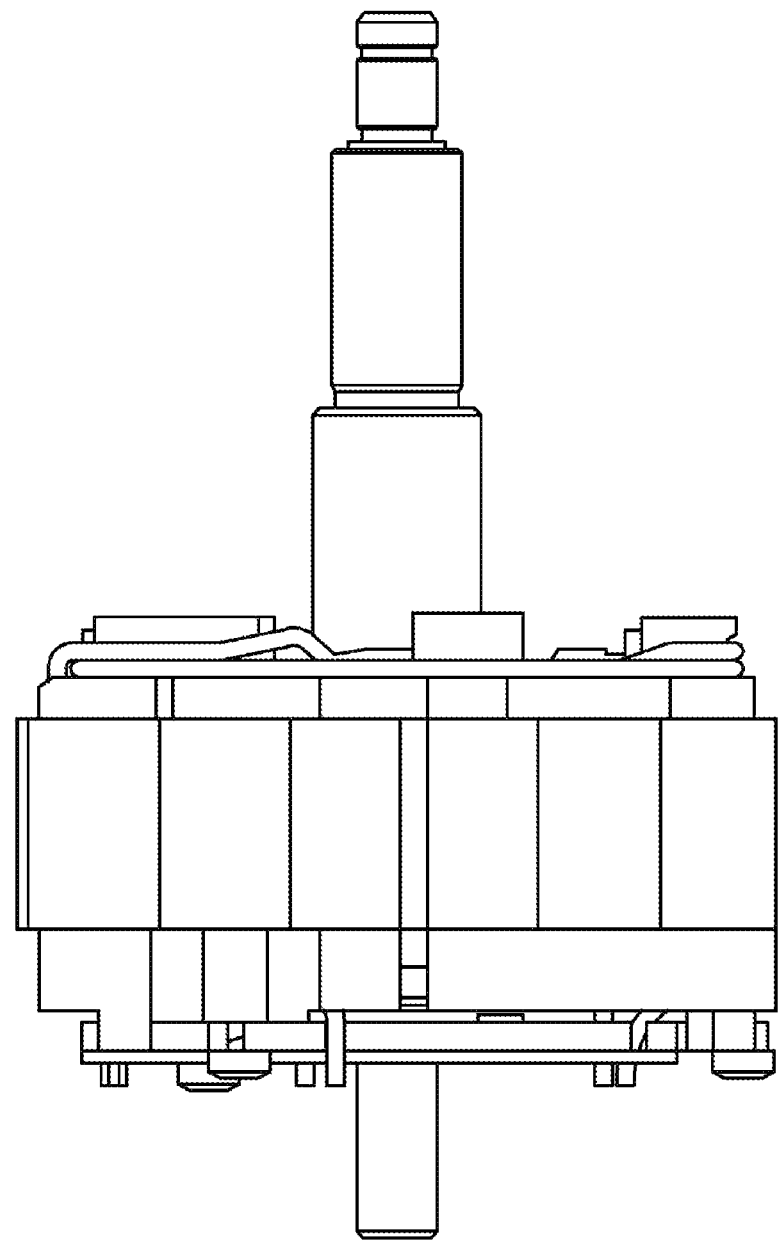
FIG. 6 shows a second electronically commutated electric motor of a defined construction size in a schematic representation.
Figure 6A:
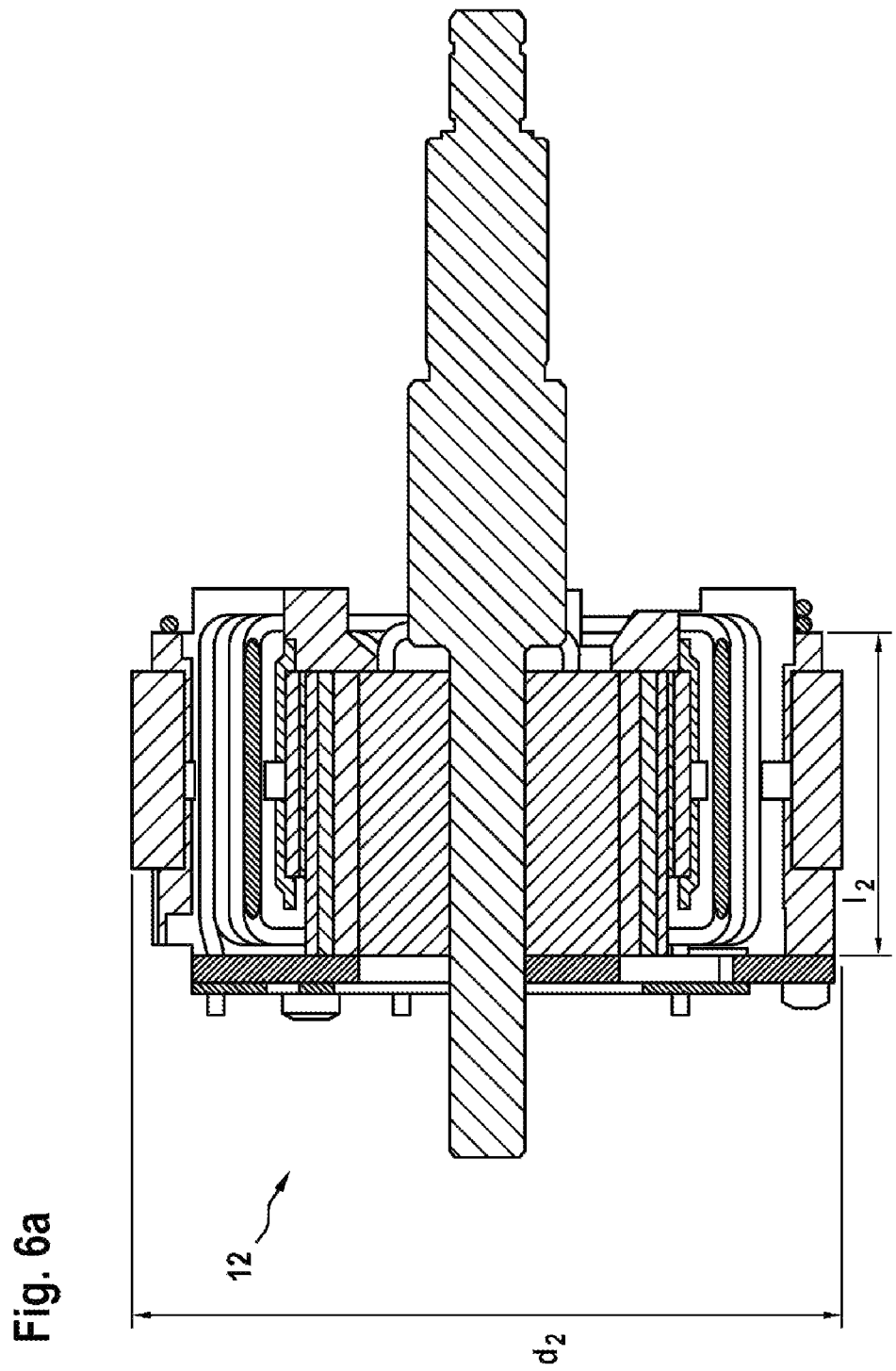
FIG. 6a shows a partial view of the second electronically commutated electric motor of a defined construction size in a schematic representation.

FIGS. 6 and 6a show an electronically commutated electric motor 12 of a second construction size. The electronically commutated electric motor 12 has a length $l_2$, which lies between 10 and 30 mm, particularly between 15 and 25 mm, but with preference is 20 mm. The electronically commutated electric motor 12 may be used with the length $l_2$ in the various hand-held power tools 16a to 16j. The values for the length $l_2$ of the electronically commutated electric motor 12 do not take into account any production tolerances occurring in the motor production process.

The electronically commutated electric motor 12 of the second construction size has a diameter $d_2$, which lies between 30 and 50 mm, particularly between 35 and 45 mm, but with preference is 44 mm. The electronically commutated electric motor 12 can be used with the diameter $d_2$ in the various hand-held power tools 16a to 16j. The values for the diameter $d_2$ of the electronically commutated electric motor 12 do not take into account any production tolerances occurring in the motor production process.

Figure 7:
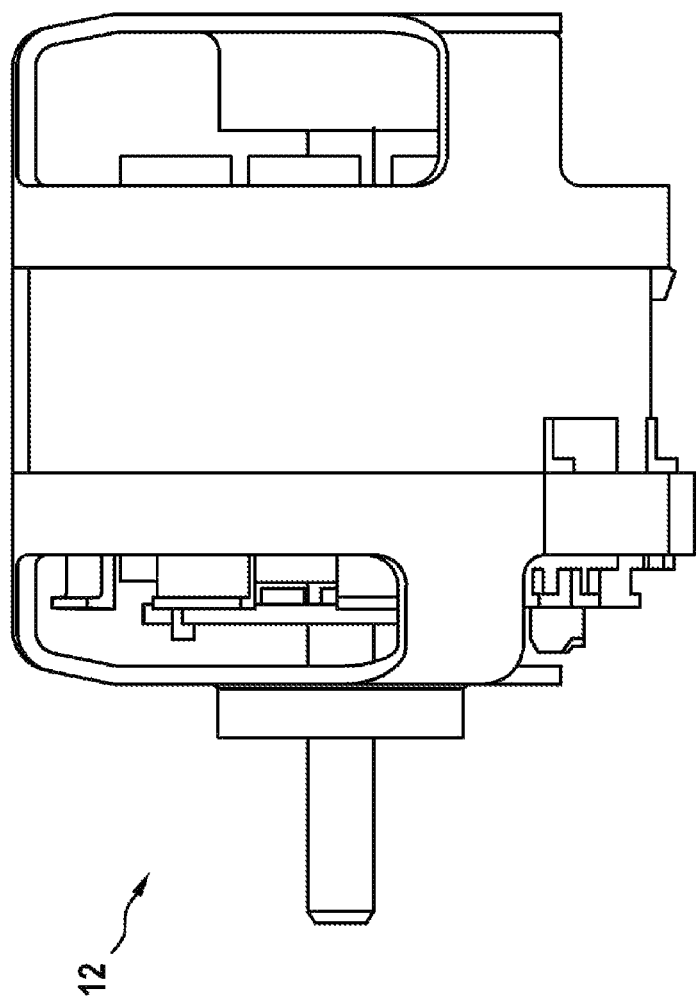
FIG. 7 shows a third electronically commutated electric motor of a defined construction size in a schematic representation.
Figure 7A:
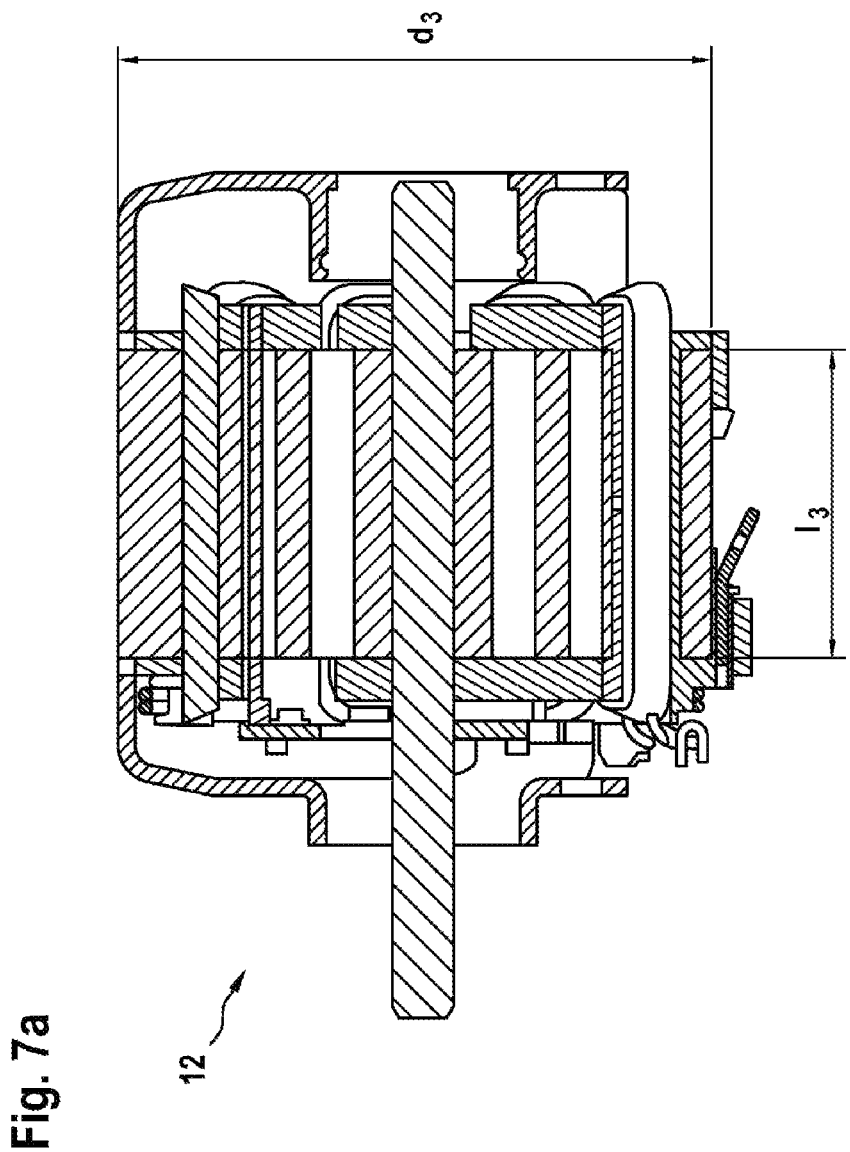
FIG. 7a shows a partial view of the third electronically commutated electric motor of a defined construction size in a schematic representation.

FIGS. 7 and 7a show an electronically commutated electric motor 12 of a third construction size. The electronically commutated electric motor 12 has a length $l_3$, which lies between 10 and 35 mm, particularly between 15 and 30 mm, but with preference is 26 mm. The electronically commutated electric motor 12 may be used with the length $l_3$ in the various hand-held power tools 16a to 16j. The values for the length $l_3$ of the electronically commutated electric motor 12 do not take into account any production tolerances occurring in the motor production process.

The electronically commutated electric motor 12 of the third construction size has a diameter $d_3$, which lies between 40 and 60 mm, particularly between 45 and 55 mm, but with preference is 50 mm. The electronically commutated electric motor 12 can be used with the diameter $d_3$ in the various hand-held power tools 16a to 16j. The values for the diameter $d_3$ of the electronically commutated electric motor 12 do not take into account any production tolerances occurring in the motor production process.

In FIGS. 5, 5a, 6, 6a, 7 and 7a, the electronically commutated electric motors are configured as internal-rotor motors. In the case of motors of this type, a stator, which bears the current-carrying windings, is located on the motor housing. A rotor, which bears the permanent magnets, is connected to the output shaft. The advantages of the internal-rotor motor are a high achievable rotational speed along with a high power density.

Figure 8:
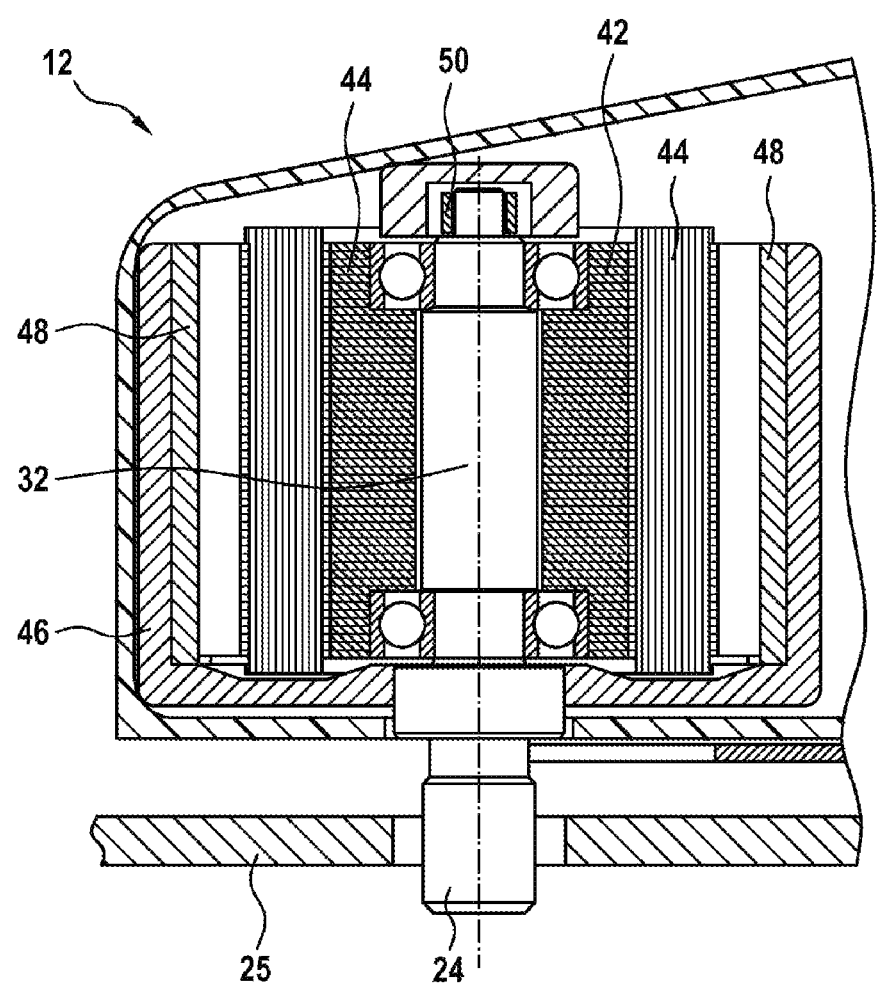
FIG. 8 shows a partial view of an external-rotor motor in a schematic representation.

FIG. 8 shows a section through an external-rotor motor. In the case of motors of this type, the stator 42, which bears the windings 44, is enclosed by the rotor 46. The magnetic field is generated by permanent magnets 48, which are arranged in the rotor 46. The rotor 46 is usually fastened to the output shaft 32, while the stator 42 is arranged on a stator support. Possible advantages of these motors are the high achievable torques. The external-rotor motor 12 may have the lengths $l_1$ to $l_3$. The external-rotor motor 12 may have the diameters $d_1$ to $d_3$.

For a required commutation, the angular position of the permanent magnet 48 in the rotor 46 is ascertained by way of one or more sensors 50 and evaluated by the electronic unit. On the basis of the angular position of the rotor 46 and the desired direction of rotation, the corresponding windings 44 are supplied with power by the electronic unit in order to produce the required torque. However, it is also conceivable that the commutation takes place without a sensor, by ascertaining a counter voltage triggered in the windings of the stator.

Furthermore, a sensor device may be provided for detecting a kickback and/or incorrect mounting of the machining tool and/or a rupturing of the machining tool during the operation of the hand-held power tool 16a to 16j and/or a fall of a hand-held power tool 16a to 16j.

Since in the case of hand-held power tools 16a to 16j with electronically commutated electric motors 12a to 12j the electronic units 20a to 20j are always designed to be more powerful and larger in terms of size and volume than in the case of brushed motors, the cooling plays an ever more important role and results in the necessity for optimum cooling. The cooling may be a passive or active configuration. In the case of passive cooling, the transporting away of the thermal energy takes place by convection. In the case of active cooling, the thermal energy of the component to be cooled is transported away with the aid of a cooling system.

In the exemplary embodiment in FIG. 2, the cooling system is a fan 52a. The fan 52a is attached to the output shaft 32a and is arranged between the electronically commutated electric motor 12a and the machining tool 25a. However, it is also conceivable that the fan 52a is not attached to the output shaft 32a, but is connected to the output shaft 32a by way of elements such as belts or toothed wheels. It is equally conceivable that other cooling systems, such as Peltier elements, heat sinks, additional actuators with air ducting elements or the like are used.

The electronic unit 20a is connected to the electronically commutated electric motor 12a. The electronic unit 20a monitors at least one of the parameters concerning the electronically commutated electric motor 12a. The parameter concerning the electronically commutated electric motor 12a is intended to be understood as meaning at least one of the following parameters of the electronically commutated electric motor 12a: a load moment, an overload moment, a rotational speed, a current, an armature voltage and/or a temperature of the electronically commutated electric motor 12a. The load moment describes a moment that is produced by a workpiece as a counter moment to a drive moment. A rise in the load moment when operation is in progress leads to be drop in the rotational speed. A drop in the rotational speed increases the current and/or voltage consumed by the electronically commutated electric motor 12a and thereby reduces the cooling effect of the fan 52a, so that the temperature measured in the electronically commutated electric motor 12a rises. Accordingly, at least one of the following parameters can be monitored: an overshooting of the overload moment, an undershooting of a limit value of the rotational speed, an overshooting of a limit value of the current, an overshooting of a limit value of the armature voltage and/or an overshooting of a limit value of the temperature. One or more parameters can be monitored in parallel. The overload moment is intended to be understood as meaning the moment which when overshot has the effect that the temperature increase becomes critical for the components of the electronically commutated electric motor 12a, i.e. destruction of the electronically commutated electric motor 12a can no longer be ruled out. By means of a setpoint-value/actual-value comparison of at least one value of the parameter, the electronic unit 20a calculates at least one activation signal for the electronically commutated electric motor 12a.

Furthermore, the electronic unit 20a is connected to the internal switch 36a. In this case, the electronic unit 20a monitors at least one of the parameters concerning the internal switch 36a. The parameter is intended to be understood as meaning at least the following parameter: a short-circuit current that flows by way of a switching contact 37a. The switching contact 37a is located between the internal switch 36a and the electronic unit 20a.

By means of a setpoint-value/actual-value comparison of at least one value of the parameter, the electronic unit 20a calculates at least one activation signal for the electronically commutated electric motor 12a.

Furthermore, the electronic unit 20a is connected to the rechargeable battery 14. The electronic unit 20a monitors at least one parameter concerning the rechargeable battery 14.

The parameter is intended to be understood as meaning at least one of the following parameters of the rechargeable battery 14: a capacity of the rechargeable battery 14 and/or an overload state of the rechargeable battery 14.

By means of a setpoint-value/actual-value comparison of the value of the parameter, the electronic unit 20a calculates at least one activation signal for the electronically commutated electric motor 12a.

The battery voltage lies in a range between 3.6 and 42 V, particularly between 7.2 and 14.4 V, but is preferably 10.8 V. The battery voltage values are in this case nominal voltage values of the battery voltage and do not take into account possible battery voltage fluctuations. The nominal voltage of a battery is given by the number of cells connected in series. The nominal voltage of the rechargeable battery 14 is not the same as the open-circuit voltage of the rechargeable battery 14.

The rechargeable battery 14 consists in particular of lithium-ion battery cells. The rechargeable battery 14 in this case comprises one or more rows of battery cells, which in turn are connected in parallel with one another. Each individual cell has a length of approximately 65 mm and a diameter of approximately 18 mm. However, it is also conceivable that a cell has a length of 65 to 70 mm and a diameter of 14 to approximately 20 mm. The figures given do not take into account possible production tolerances. Lithium-ion storage batteries are distinguished by a high energy density and thermal stability even under high loads, which means they produce high power. Another great advantage is the low self-discharge, which has the effect that the storage batteries are also ready for use even after lengthy periods of non-use. These advantages give rise to the advantages of the hand-held power tools 16a to 16j according to the disclosure, in particular the compactness of the hand-held power tools 16a to 16j together with a high power output capacity.

However, it is also conceivable that the rechargeable battery 14 consists of lithium-air cells, lithium-sulfur cells, lithium-polymer cells or the like. Furthermore, the rechargeable battery 14 may be realized in a geometrical configuration other than that shown, such as for example an angular configuration.

In one exemplary embodiment, the hand-held power tool 16a to 16j can be operated both in an eco mode and in a boost mode.

In eco mode, the electronically commutated electric motor 12a to 12j of the hand-held power tools 16a to 16j is operated at the optimum operating point.

In boost mode, the electronically commutated electric motor 12a to 12j is operated particularly powerfully. In this mode, the power peak of the electronically commutated electric motor 12a to 12j is between 10% and 100%, particularly between 20% and 50%, but with preference at 33% of the nominal power. The time limitation of the boost mode lies between 0 and 5 min, particularly between 0 and 2.5 min. With preference, the time limitation of the boost mode lies between 30 s and 1 min.

Figure 9:
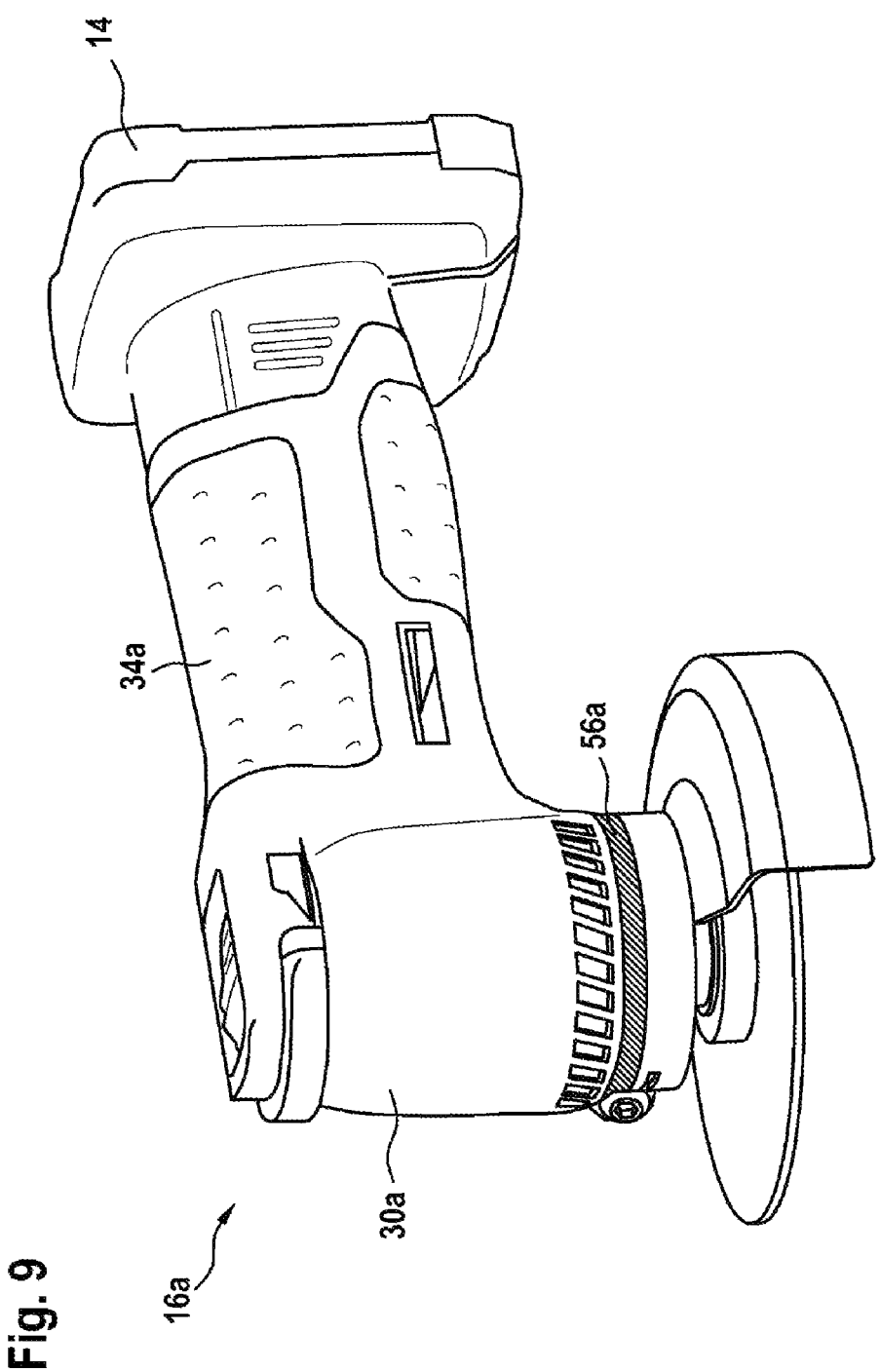
FIG. 9 shows a second embodiment of the first hand-held power tool according to the disclosure in a schematic representation.

In FIG. 9, a second embodiment of the first hand-held power tool 16a is represented. Arranged on the first housing part 30a of the hand-held power tool 16a is a lighting device 56a. The lighting device 56a may however also be arranged on the second housing part 34a. The lighting device 56a may illuminate a work area, but also project optical information onto a workpiece and/or a surrounding area. The lighting device 56a may consist both of individual lighting means and of multiple lighting means and have for example a single LED and multiple LEDs. The lighting means may be provided in various construction forms and sizes. The lighting device 56a may however also be configured as a spot light source. However, it is also conceivable that the lighting device 56a is configured as a projection device. The lighting device 56a may have lighting elements, which may be arranged in various ways on the first housing part 30a and/or on the second housing part 34a.

The lighting device 56a may be formed as a closed luminous ring. The emitted light may have different colors. The light emitted by the luminous ring may vary in brightness. The light emitted by the luminous ring may be a flashing light, which changes brightness periodically. The luminous ring may be connected to the first housing part 30a and/or the second housing part 34a by adhesive bonding, locking engagement, clamping, clipping or the like.

The lighting device 56a may be formed as a running light. The light emitted by the running light may have different colors. The light emitted by the running light may vary in brightness. The running light may be connected to the first housing part 30a and/or the second housing part 34a by adhesive bonding, locking engagement, clamping, clipping or the like.

Furthermore, the lighting device 56a in FIG. 9 is provided for providing the operator of the hand-held power tool 16a with an indication concerning the parameters of the hand-held power tool 16a. The parameters associated with the hand-held power tool 16a are at least the following:

A capacity of the rechargeable battery 14

An overload state of the hand-held power tool 16a, in particular of the electronically commutated electric motor 12a, of the electronics 20a and/or of the rechargeable battery 14

A rotational speed of the electronically commutated electric motor 12a

A current, a voltage and/or a temperature of the electronically commutated electric motor 12a A temperature of the electronically commutated electric motor 12a and/or of the electronics 20a The indication of the parameters of the hand-held power tool 16a may be realized for example by the following indicating possibilities:

A change in the color of the light

A change in the intensity of the light

Light pulses of differing length

Light pulses of differing brightness

Running light with change in the running direction of the light

Light pulses, varying in pulse frequency and/or brightness

Further indications of the parameters of the hand-held power tool 16a that appear appropriate to a person skilled in the art are also possible.

Figure 10:
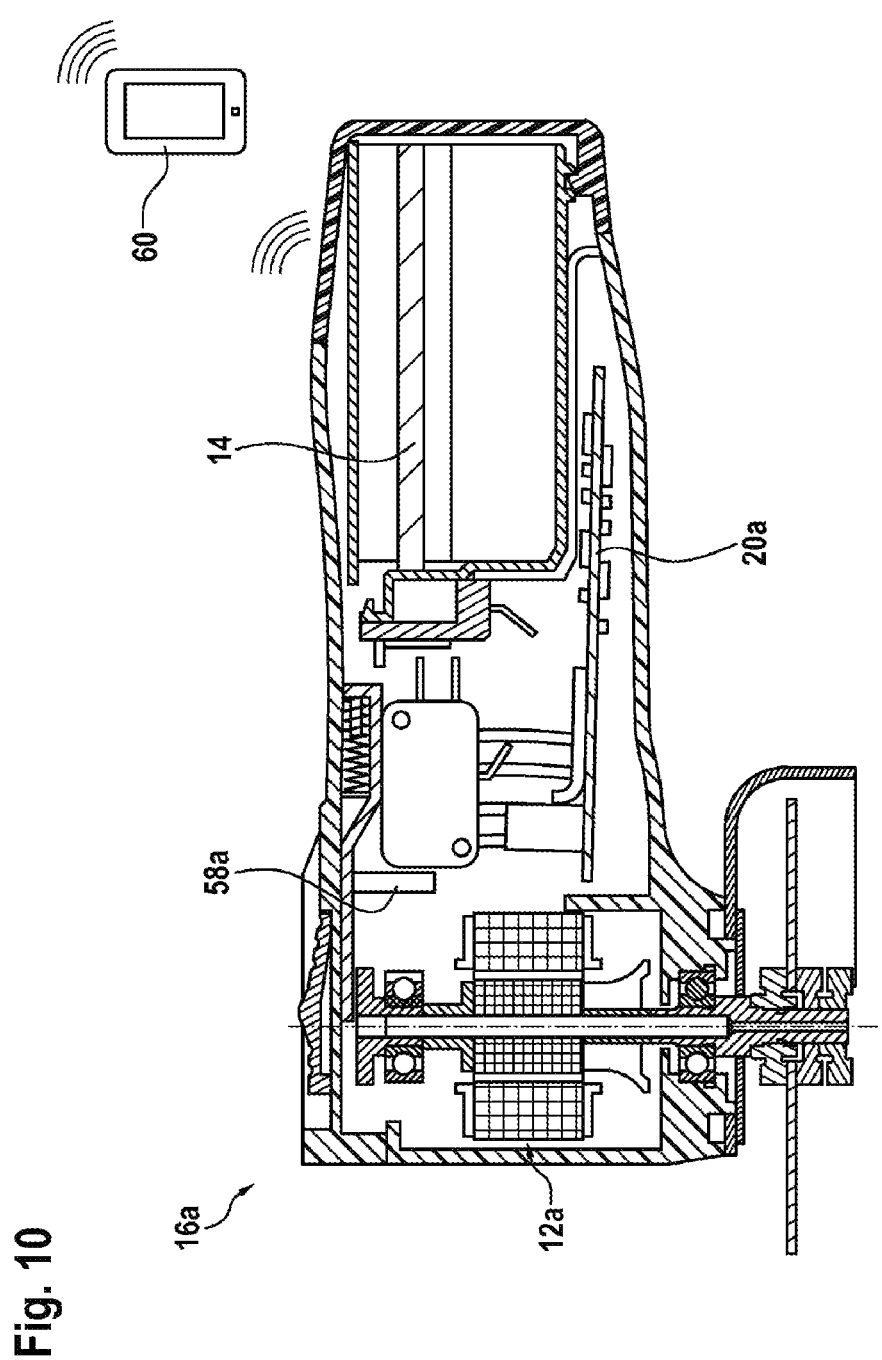
FIG. 10 shows a third embodiment of the first hand-held power tool according to the disclosure in a schematic representation.

FIG. 10 shows a further embodiment of the hand-held power tool 16a according to the disclosure. The hand-held power tool 16a is provided with an interface 58a, which is provided for making possible a data exchange, in particular an electronic data exchange, between the hand-held power tool 16a, in particular the electronics 20a of the hand-held power tool 16a, and an external communication and/or data processing unit 60. The data exchange between the electronics 20a and the external communication and/or data processing unit 60 takes place with preference in a cableless manner, for example with the aid of a Bluetooth connection, Bluetooth Low Energy, a WLAN connection, an NFC connection, an infrared connection or the like. The electronics 20a controls the electronically commutated electric motor 12a in an open-loop and/or closed-loop manner, with preference in dependence on the parameters of the hand-held power tool 16a.

The external communication and/or data processing unit is preferably formed as a smart interface, for example as a smart phone, which has an app for communication with the interface 58a. However, it is also conceivable that the external communication and/or data processing unit 60 is formed as an external, transportable communication and/or data processing unit, as a fixedly installed communication and/or data processing unit or some other centralized or decentralized communication and/or data processing unit that appears appropriate to a person skilled in the art. A synchronization of electronic data can consequently be advantageously made possible. Settings stored in the external communication and/or data processing unit 60, such as for example a set rotational speed, maximum power or the like, may for example be transmitted directly to the hand-held power tool 16a.

Figure 11:
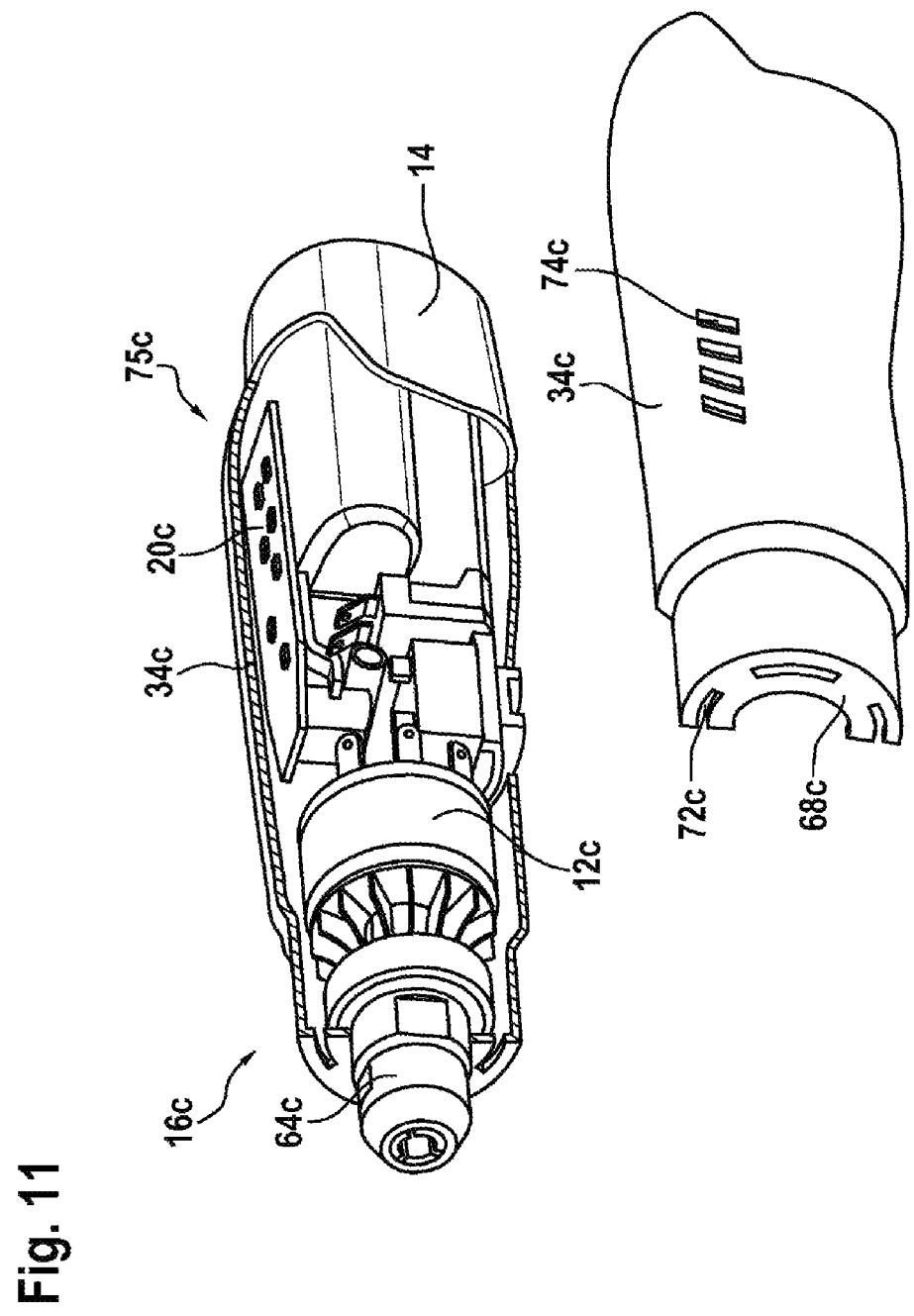
FIG. 11 shows a third hand-held power tool according to the disclosure in a schematic representation.

In FIG. 11, the hand-held power tool 16c is formed as a straight grinder 16c. A second housing part 34c is formed as a handle. In a further embodiment, the housing part 34c may also be formed as a cup housing. However, it is also conceivable that the first housing 34c consists of a further housing part, for example a cover.

Arranged in the housing part 34c is the electronically commutated electric motor 12c. The electronically commutated electric motor 12 is arranged between a rechargeable battery 14 and a tool holder 64c. The electronically commutated electric motor 12c may be actively braked by way of a brake, in particular by way of an electronic brake. The electronics 14c are likewise arranged in the housing part 34c. The electronics 20c supply power to the electronically commutated electric motor 12c. The rechargeable battery 14 serves as an energy source for the electronically commutated electric motor 12c. The electronically commutated electric motor 12c drives a tool spindle. The tool holder 64c serves for receiving a machining tool that is not represented any more specifically for the straight grinder 16c. The tool holder 24c is formed as a collet. The machining tool may be a milling, polishing, grinding or similar element that is not represented any more specifically.

The tool holder 64c has a diameter d, which lies between 4.0 and 8.0 mm. With preference, the diameter d is 6.0 mm. The figure given does not take into account any production tolerances.

Figure 11A:
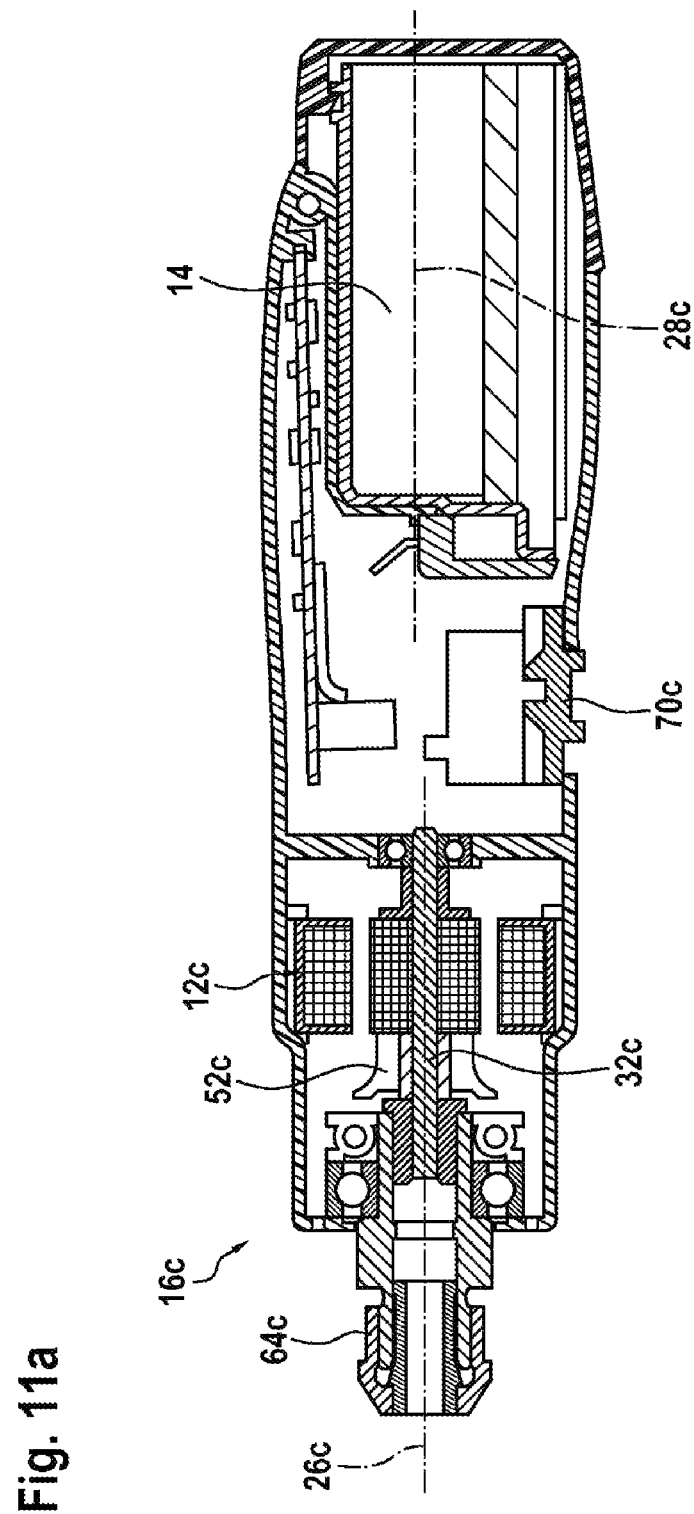
FIG. 11a shows a partial view of the third hand-held power tool according to the disclosure in a schematic representation.

In FIG. 11a, the straight grinder 16c according to the disclosure is schematically represented in a partial view.

As evident in FIG. 11a, the electronically commutated electric motor 12c is an internal-rotor motor. The electronically commutated electric motor 12c may be the electronically commutated electric motor that is shown in FIG. 5.

The rotational speed, which can be measured at the tool spindle, is set by way of an adjusting element 70c. In the exemplary embodiment, the nominal rotational speed at the tool spindle is at least 15 000 rpm. The rotational speed can be increased up to 50 000 rpm.

A fan 52c is integrated in the second housing part 34c. It is particularly advantageous if the fan 52c is integrated between the electronically commutated electric motor 12 and the tool holder 64c. The fan 52c may however also be arranged between the electronically commutated electric motor 12 and the electronics 20c. It is equally conceivable to dispense with the fan 52c and realize the cooling for example by way of intelligently arranged cooling ribs and/or heat sinks.

As evident in FIG. 11, four air outlet openings 72c have been introduced into an annular housing wall 68c. It is equally conceivable that fewer than or more than four air outlet openings 72c are introduced into the annular housing wall 68c.

Air inlet openings 74c have been introduced into the second housing part 34c. A cooling flow is produced by the fan 52c and passes from the air inlet openings 74c to the air outlet openings 72c.

In the exemplary embodiment, the rechargeable battery 14 is connected on a rear side 75c, facing away from the tool holder 64c, of the straight grinder 16c. The battery voltage lies in a range between 3.6 and 42 V, particularly between 7.2 and 14.4 V, but with preference is 10.8 V. The values of the battery voltage do not take into account possible battery voltage fluctuations. The rechargeable battery 14 is connected here to the straight grinder 10c in such a way that a large part of the rechargeable battery 14 in the housing lies within the straight grinder 16c, and consequently contributes to a compact type of construction.

It is also possible by activating a switching element to activate a blocking device in order to arrest a tool spindle. The blocking device may be configured as a slide, pin or lever. The arresting of the spindle may take place by interlocking and/or frictional engagement. It is in this case conceivable that elements, such as for example locking or friction disks, are provided on the drive shaft 32c. The blocking device may be configured as a separate component. However, it is also conceivable that the blocking device is integrated in an existing component or is combined with it. Such a component may be a switching element, an adjusting element or the like. The arresting of the spindle may take place automatically. However, it is also conceivable that the arresting of the spindle can be actuated manually.

Figure 12:
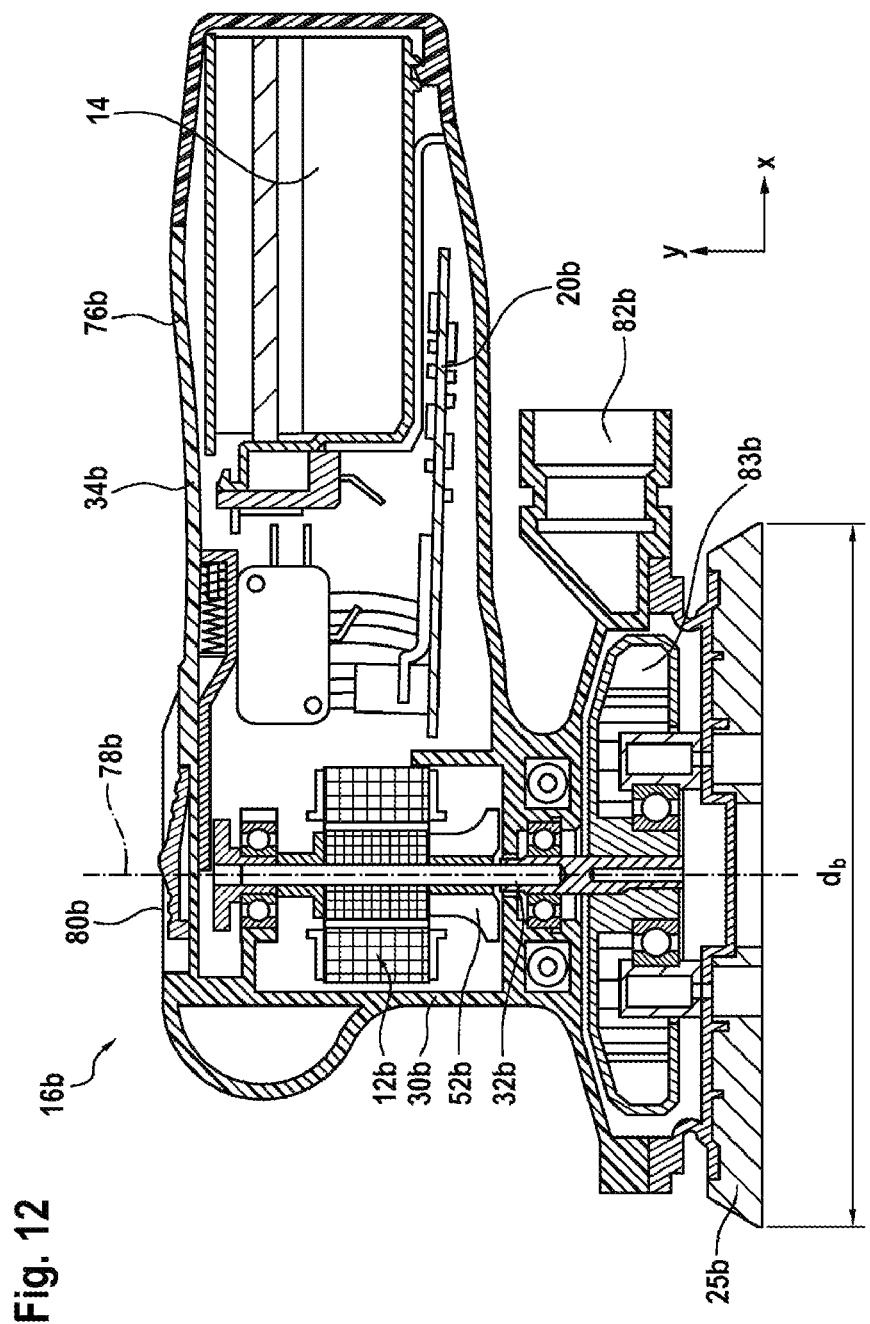
FIG. 12 shows a partial view of the second hand-held power tool according to the disclosure in a schematic representation.

In FIG. 12, the second hand-held power tool 16b, formed as an eccentric grinder 16b, is shown in a schematic representation. Arranged in the first housing part 30b is the electronically commutated electric motor 12b. The electronically commutated electric motor 12b is connected to the output shaft 32b. The output shaft 32b is connected by way of an eccentrically arranged bearing to a bearing shaft, which bears the machining tool 25b. In the exemplary embodiment, the machining tool 25b of the hand-held power tool 16b is a grinding wheel, on the underside of which a grinding means can be fastened for the surface machining of a workpiece. The machining tool 25b of the hand-held power tool 16b has a diameter $d_b$, which lies between 75 and 150 mm, but preferably between 115 and 125 mm. The bearing may be configured as a ball bearing and makes it possible for the bearing shaft to rotate itself about an axis of rotation that at the same time represents the rotational axis of the machining tool 25b. The rotational axis of the bearing shaft lies at an eccentric distance parallel to an axis of rotation 78b of the output shaft 32b.

The second housing part 34b is formed as a handle 76b or serves for an operator of the hand-held power tool 16b as a handle. The first housing part 30b and the handle 76b are arranged at an angle in relation to one another. With preference, the first housing part 30b and the handle 76b are at an angle of approximately 90° to one another. The figure given for the angle does not take into account any production tolerances.

Arranged in the second housing part 34b are the electronics 20b. The electronics 20b are provided for supplying the electronically commutated electric motor 12b with electrical energy. In the exemplary embodiment, the electronics 20b are arranged in the second housing part 34b. However, it is also conceivable that the electronics 20b are for example integrated in the electronically commutated electric motor 12b or configured separately.

In order to achieve guidance of the hand-held power tool 16b that can be handled particularly easily, it is of advantage to arrange a second gripping region 80b on the first housing part 30b. The second gripping region 80b is formed in particular as a knob, which also from a visual aspect provides a pleasing appearance. The second gripping region 80b is designed in such a way that it lies particularly ergonomically in the hand of the operator.

The electronically commutated electric motor 12b drives the bearing shaft in particular directly. "Directly" is intended to be understood as meaning that the electronically commutated electric motor 12b is connected to the bearing shaft without a conventional gear mechanism, such as for example a planetary-gear, bevel-gear or spur-gear mechanism, in between.

The eccentrically arranged machining tool 25b of the hand-held power tool 16b performs an oscillating movement. The stroke thereby produced is twice the eccentric distance between the rotational axis of the bearing shaft and the axis 78b.

As evident in FIG. 12, the electronically commutated electric motor 12b is an internal-rotor motor. The electronically commutated electric motor 12b may be the electronically commutated electric motor that is shown in FIG. 5.

A further embodiment according to the disclosure of the hand-held power tool 16b is represented in FIG. 12a. As evident in FIG. 12a, the electronically commutated electric motor 12b is an external-rotor motor.

In the exemplary embodiments, the rotational speed is between 3000 rpm and 15 000 rpm, in particular with preference from 8000 rpm to 11 000 rpm. Furthermore, the rotational speed can be reduced by way of an adjusting element.

The fan 52b is integrated in the first housing part 30b. In the exemplary embodiment in FIG. 12, the fan 52b is integrated between the electronically commutated electric motor 12 and the machining tool 25b. However, it is also conceivable that other cooling systems, such as Peltier elements, closed cooling circuits or the like, are used. It is equally conceivable to dispense with the fan and to realize the cooling for example by way of intelligently arranged cooling ribs and/or heat sinks.

A dust extraction device 82b is fastened to the first housing part 30b. In the machining tool 25b, bores have been introduced, distributed over the circumference, and are used to suck grinding dust occurring during the machining of the workpiece into the first housing part 30b with the aid of a dust fan 83b, the dust fan 83b being securely connected to the output shaft 32b. The grinding dust transported through the bores of the machining tool 25b is directed by way of the dust extraction device 82b into a dust collecting container that is not represented.

The battery voltage lies in a range between 3.6 and 42 V, in particular between 7.2 and 14.4 V, but with preference is 10.8 V. The values of the battery voltage do not take into account possible battery voltage fluctuations.

Figure 13:
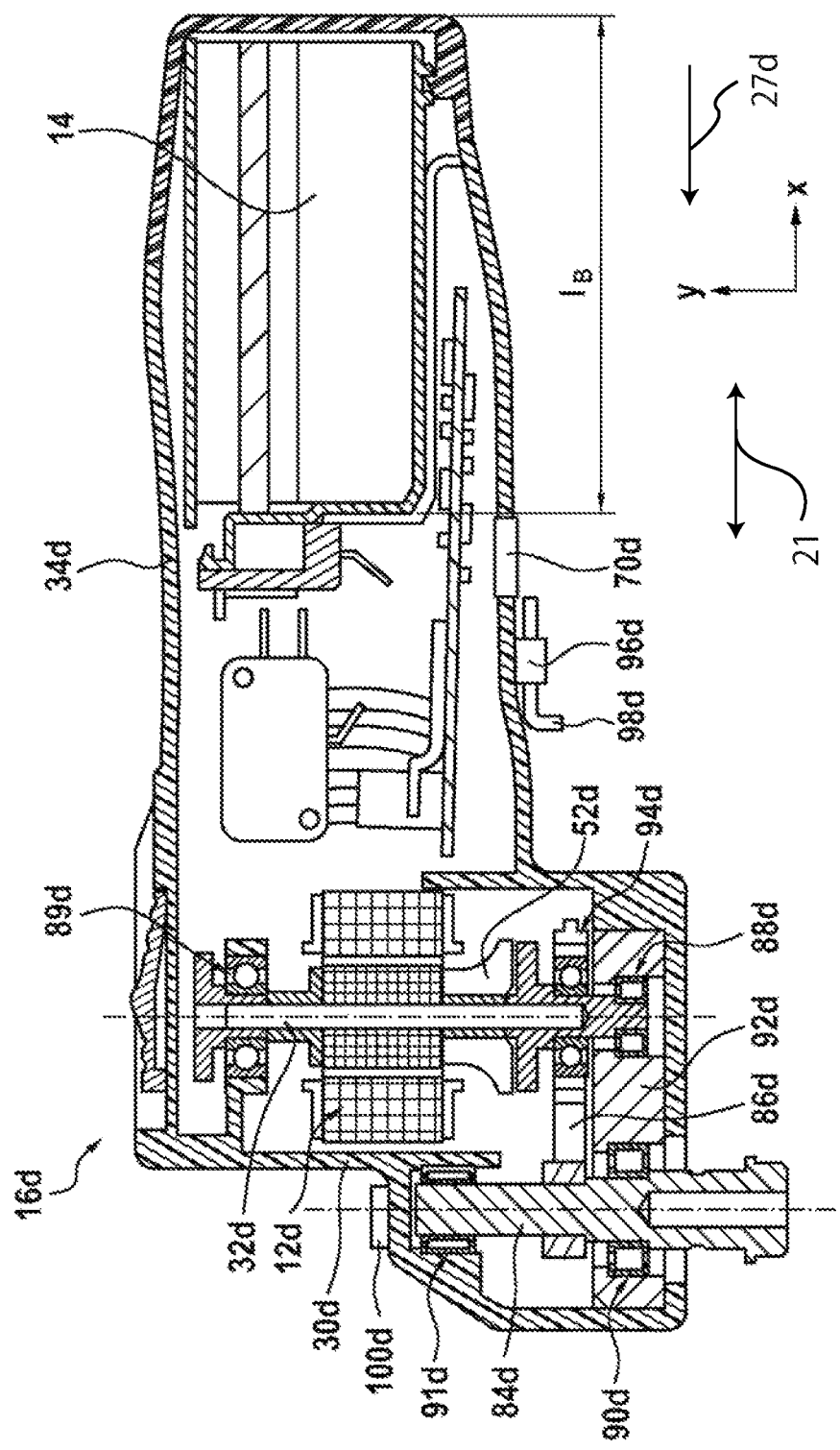
FIG. 13 shows a partial view of a fourth hand-held power tool according to the disclosure in a schematic representation.

In FIG. 13, the hand-held power tool 16d is formed as an oscillating multitool 16d.

Arranged in the first housing part 30d is an electronically commutated electric motor 12d, which drives the output shaft 32d. A tool shaft 84d bears a tool, which can be driven in an oscillating manner and is not represented any more specifically. The second housing part 34d adjoins the first housing part 32d. The first housing part 32d and the second housing part 34d may be configured in one piece or as separate component units.

The second housing part 34d serves for a user of the hand-held power tool 16d as a handle or is formed as a handle. The second housing part 34d is also provided for the pushing-in of the rechargeable battery 14.

In the exemplary embodiment in FIG. 13, the electronically commutated electric motor 12d is an internal-rotor motor. The electronically commutated electric motor 12 may be the electronically commutated electric motor that is shown in FIG. 5.

The output shaft 32d and the tool shaft 84d are arranged parallel to one another. The output shaft 32d and the tool shaft 84d may however also be arranged at an angle to one another, which lies between −30 and 30°, particularly between −10 and 10°, but with preference between −3.0 and 3.0°. The figure given for the angle does not take into account any possible tolerances in giving the angle.

The rotational movement of the output shaft 32d is transmitted by way of a coupling/connecting element 86d to the tool shaft 84d. The coupling/connecting element 86d is arranged between the output shaft 32d and the tool shaft 84d. With the aid of the coupling/connecting element 86d, the rotating movement of the output shaft 32d is transformed into an oscillating pendular movement of the tool shaft 84d.

The oscillating pendular movement lies in an angular range between 0.4 and 2.5°, particularly between 0.8 and 1.6°, but with preference between 1 and 1.4°. Up to 30 000 pendular movements are performed in one second, but particularly 25 000 pendular movements in one second, but with preference up to 20 000 pendular movements in one second.

As evident from FIG. 13, on its end side facing the tool, the output shaft 32d is rotatably accommodated in a first bearing 88d and, on its side facing away from the tool, it is rotatably accommodated in a second bearing 89d. On its end side facing the tool, the tool shaft 84d is rotatably accommodated in a third bearing 90d and, on its side facing away from the tool, it is rotatably accommodated in a fourth bearing 91d.

The two bearings 88d, 90d are connected to one another in particular by way of a bearing plate 92d. The bearing plate 92d is in this case configured as a separate component with respect to the first housing part 30d. The bearing plate 92d is made of a metal or composite material, whereby the strength can be increased.

The four bearings 88d, 89d, 90d, 91d may be configured as a fixed or floating bearing.

The fan 52d is arranged in the first housing part 30d. The fan 52d is attached to the output shaft 32d and is arranged between the electronically commutated electric motor 12d and the eccentric element 94d. However, it is also conceivable that the fan 52d is not attached to the output shaft 32d, but is connected to the output shaft 32d by way of elements such as belts or toothed wheels. It is equally conceivable that other cooling systems, such as Peltier elements, heat sinks, additional actuators with air ducting elements or the like are used.

The rechargeable battery 14 is at least partially arranged on the second housing part 34d of the hand-held power tool 16d. In this case, a large part of a battery length $l_B$ is integrated in the second housing part 34d. The pushing-in direction 27d of the rechargeable battery 14 lies here coaxially in relation to the main direction of extent 21 of the second housing part 34d.

The battery voltage lies in a range between 3.6 and 42 V, in particular between 7.2 and 18 V. With preference, however, the battery voltage is 10.8 V. The values of the battery voltage do not take into account possible battery voltage fluctuations.

An adjusting element 70d is arranged on a lower side of the second housing part 34d. The adjusting element 70d is provided for setting a rotational speed and/or an operating mode, such as for example an eco mode or a boost mode.

A holding element 96d is likewise arranged on the lower side of the second housing part 34d. The holding element accommodates a tool 98d, which is provided for changing a machining tool.

A pressure element 100d is arranged on the first housing part 30d and is provided for making it possible for the machining tool to be changed without the use of a tool.

Figure 14:
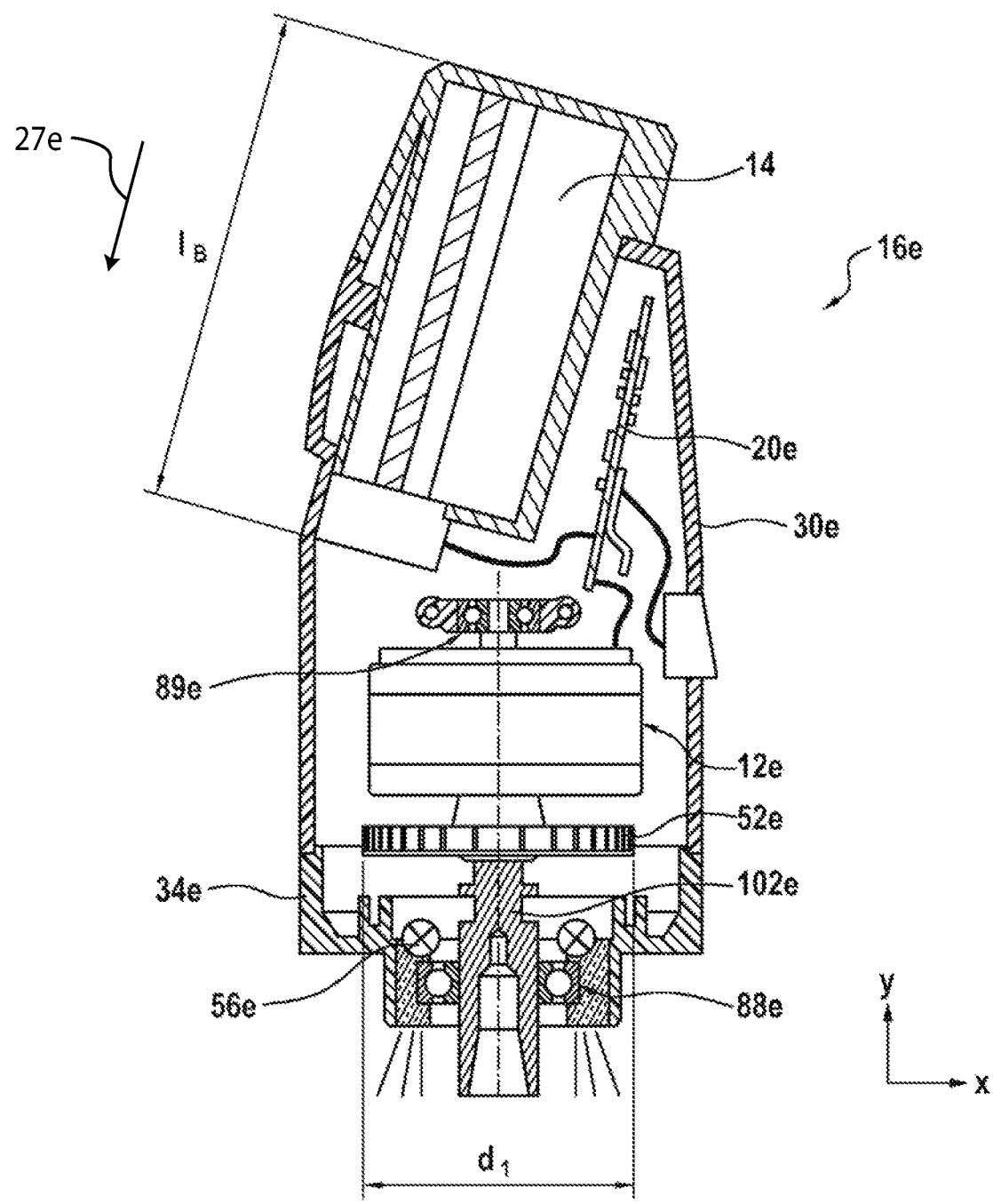
FIG. 14 shows a fifth hand-held power tool according to the disclosure in a schematic representation.

FIG. 14 shows the hand-held power tool 16e as a router 16e. The electronically commutated electric motor 12e is arranged in the first housing part 30e. The electronically commutated electric motor 12e is connected to an output shaft 32e. The output shaft 32e continues in a tool spindle 102e. However, it is also conceivable that the output shaft 32e is connected to the tool spindle 102e by way of a coupling. However, it is also conceivable that the output shaft 32e is connected to the tool spindle 102e by way of a conventional gear mechanism or a belt drive. The tool spindle 102e bears a tool holder that is not represented any more specifically. The tool holder is for example a collet. A machining tool is inserted in the collet and securely clamped by means of a union nut. The machining tool is for example a milling tool. The router 16e is for example suitable for milling grooves or for edge milling.

The electronics 20e are provided inter alia for supplying power to the electronically commutated electric motor 12e. The electronics 20e are arranged in the first housing part 30e.

The electronic unit 20e evaluates the value of a parameter that characterizes the router 16e or multiple parameters characterizing the router 16e.

One or more of the parameters may be measured and evaluated. If an actual value of one of the parameters deviates in an inadmissible way from its setpoint value, in particular an activation signal for a voltage of the electronically commutated electric motor 12e is chosen in such a way that a power output to the electronically commutated electric motor 12e is reduced.

In the exemplary embodiment, the electronically commutated electric motor 12e may be an internal-rotor motor. The electronically commutated electric motor 12e may be the electronically commutated electric motor that is shown in FIG. 5.

As evident in FIG. 14, on its side facing the tool, the output shaft 32e is rotatably accommodated in a first bearing 88e and, on its side facing away from the tool, is rotatably accommodated in a second bearing 89e.

The rechargeable battery 14 is at least partially connected to the first housing part 30e. In this case, a large part of a battery length $l_B$ is integrated in the first housing part 30e. The pushing-in direction 27e of the rechargeable battery 14 extends along a y direction of the router 16e.

The battery voltage lies in a range between 3.6 and 42 V, in particular between 7.2 and 18 V. With preference, however, the battery voltage is 10.8 V. The values of the battery voltage do not take into account possible battery voltage fluctuations.

An adjusting device is provided for setting a rotational speed and/or an operating mode, such as for example an eco mode or a boost mode.

The rotational speed of the router 16e according to the disclosure lies between 8000 and 35 000 rpm, particularly between 10 000 and 25 000 rpm. With preference, the rotational speed is 20 000 rpm.

Furthermore, the router 16e can be operated in an automatic mode. In the automatic mode, the rotational speed is automatically controlled in a closed-loop manner in dependence on a parameter that is specific to the machining tool and/or specific to the application.

A parameter that is specific to the machining tool and/or specific to the application is for example an advancing speed, a diameter and/or a geometrical dimension of the machining tool or a material of a machining workpiece.

In the exemplary embodiment in FIG. 14, the lighting device 56e is arranged on a second housing part 34e of the router 16e. The lighting device 56e may however also be arranged on the first housing part 30e. The lighting device 56e may however also be arranged on the tool holder. The lighting device 56e may illuminate a work area, but also project optical information onto a surrounding area. The lighting device 56e may consist both of a single LED and also multiple LEDs. The LEDs may be provided in various construction forms and sizes. The lighting device 56e may however also be configured as a spot light source. However, it is also conceivable that the lighting device 56e is configured as a projection device. The lighting device 56e may have lighting elements, which may be arranged in various ways on the first housing part 30e and/or on the second housing part 34e.

The fan 52e is attached to the output shaft 32e and is arranged between the electronically commutated electric motor 12e and the tool spindle 102e. However, it is also conceivable that the fan 52e is not attached to the output shaft 32e, but is connected to the output shaft 32e by way of elements such as belts or toothed wheels. It is equally conceivable that other cooling systems, such as Peltier elements, heat sinks, additional actuators with air ducting elements or the like are used.

Figure 15A:
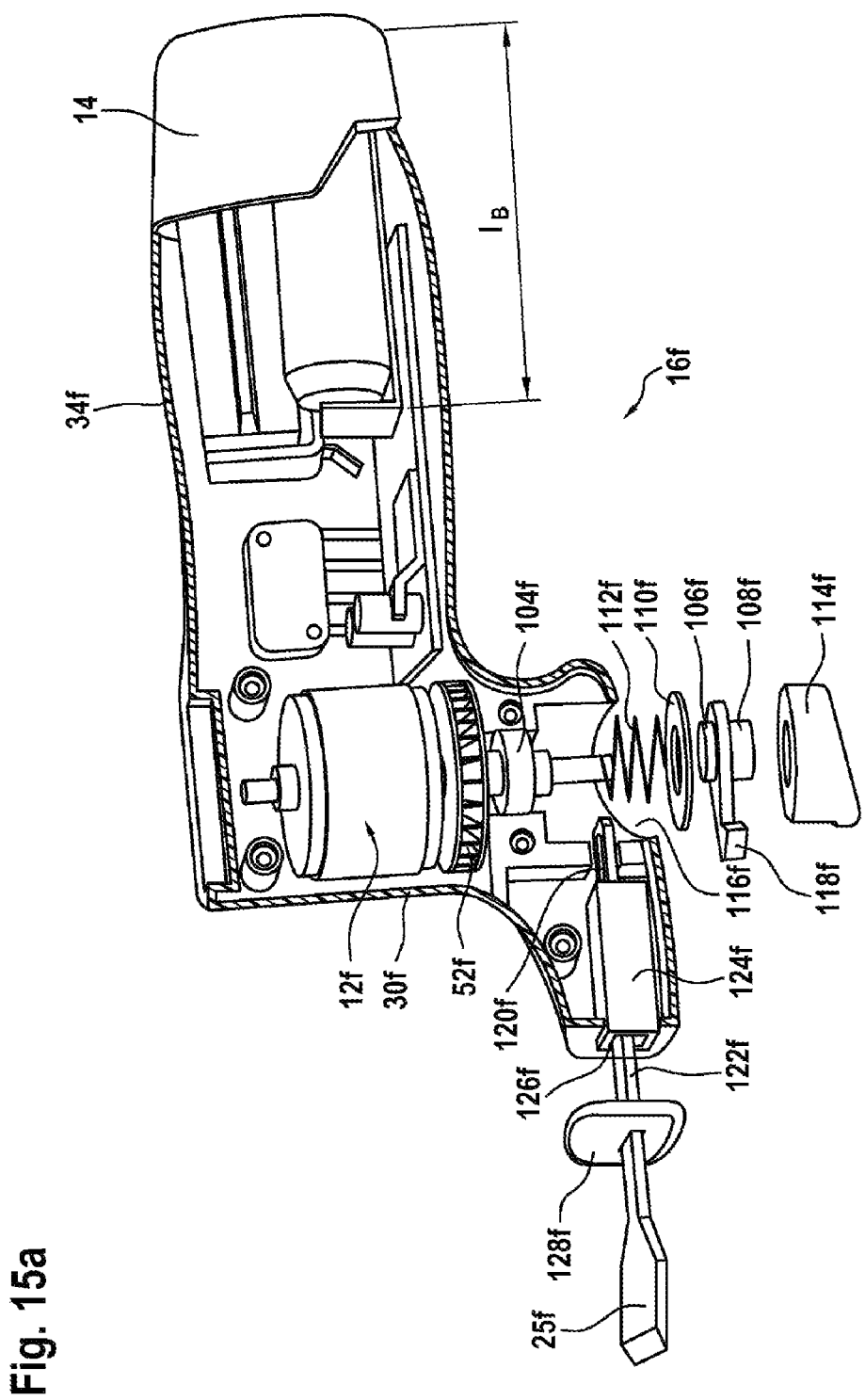
FIG. 15a shows a view of the sixth hand-held power tool according to the disclosure, partially in an exploded representation.

FIG. 15 shows a hand-held power tool 16f formed as an electric scraper 16f for machining surfaces by scraping. The electric scraper 16f has an electronically commutated electric motor 12f, which is arranged in the first housing part 30f and is provided for driving the machining tool 25f. The machining tool 25f may be a scraper, spreader, blade or the like. The electronically commutated electric motor 12f is connected to an output shaft 32f. The output shaft 32f bears an eccentric element 94f. Mounted on the eccentric element 94f, as represented in FIG. 15a, is a ball bearing 104f. One end of the eccentric element 94f that is facing the machining tool 25f engages in a through-opening 106f of a driving element 108f.

As evident in FIG. 15a, a disk 110f and a spring element 112f are arranged between the driving element 108f and the ball bearing 104f. A closure element 114f closes a lower opening 116f of the first housing part 30f. When the closure element 114f is actuated, the machining tool 25f of the electric scraper 16f can be removed. With a lug 118f, the driving element 108f engages in a clearance 120f in a clamped end of a shank 122f of the machining tool 25f. As soon as the output shaft 32f rotates, the eccentric element 94f circulates about its axis of rotation, with the driving element 108f following it.

It is also shown in FIG. 15a that the machining tool 25f is guided in a longitudinal guide 124f. The longitudinal guide 124f is formed in such a way that it reaches around the shank 122f of the machining tool 25f. The longitudinal guide 124f is provided with a rectangular guiding slot 126f extending right through it. The shank 122f of the machining tool 25f passes through the guiding slot 126f. A sealing element 128f closes a front opening of the first housing part 30f. The shank 122f of the machining tool 25f passes through the front opening of the first housing part 30f.

The spring element 112f, the disk 110f, the driving element 108f, the closure element 114f, the machining tool 25f, the longitudinal guide 124f and the sealing element 128f are shown in FIG. 15a in an exploded representation.

In the exemplary embodiment, the electronically commutated electric motor 12f is an internal-rotor motor. The electronically commutated electric motor 12f may be the electronically commutated electric motor that is shown in FIG. 6.

The rechargeable battery 14 is at least partially connected to the second housing part 34f. In this case, a large part of a battery length $l_B$ is integrated in the second housing part 34f and forms with it a common axis, which lies coaxially in relation to the pushing-in direction of the rechargeable battery 14.

The battery voltage lies in a range between 3.6 and 42 V, in particular between 7.2 and 18 V. With preference, however, the battery voltage is 10.8 V. The values of the battery voltage do not take into account possible battery voltage fluctuations.

The second housing part 34f serves for a user of the electric scraper 16f as a handle or is formed as a handle.

The fan 52f is attached to the output shaft 32f and is arranged between the electronically commutated electric motor 12f and the eccentric element 94f. However, it is also conceivable that the fan 52f is not attached to the output shaft 32f, but is connected to the output shaft 32f by way of elements such as belts or toothed wheels. It is equally conceivable that other cooling systems, such as Peltier elements, heat sinks, additional actuators with air ducting elements or the like are used.

Figure 15B:
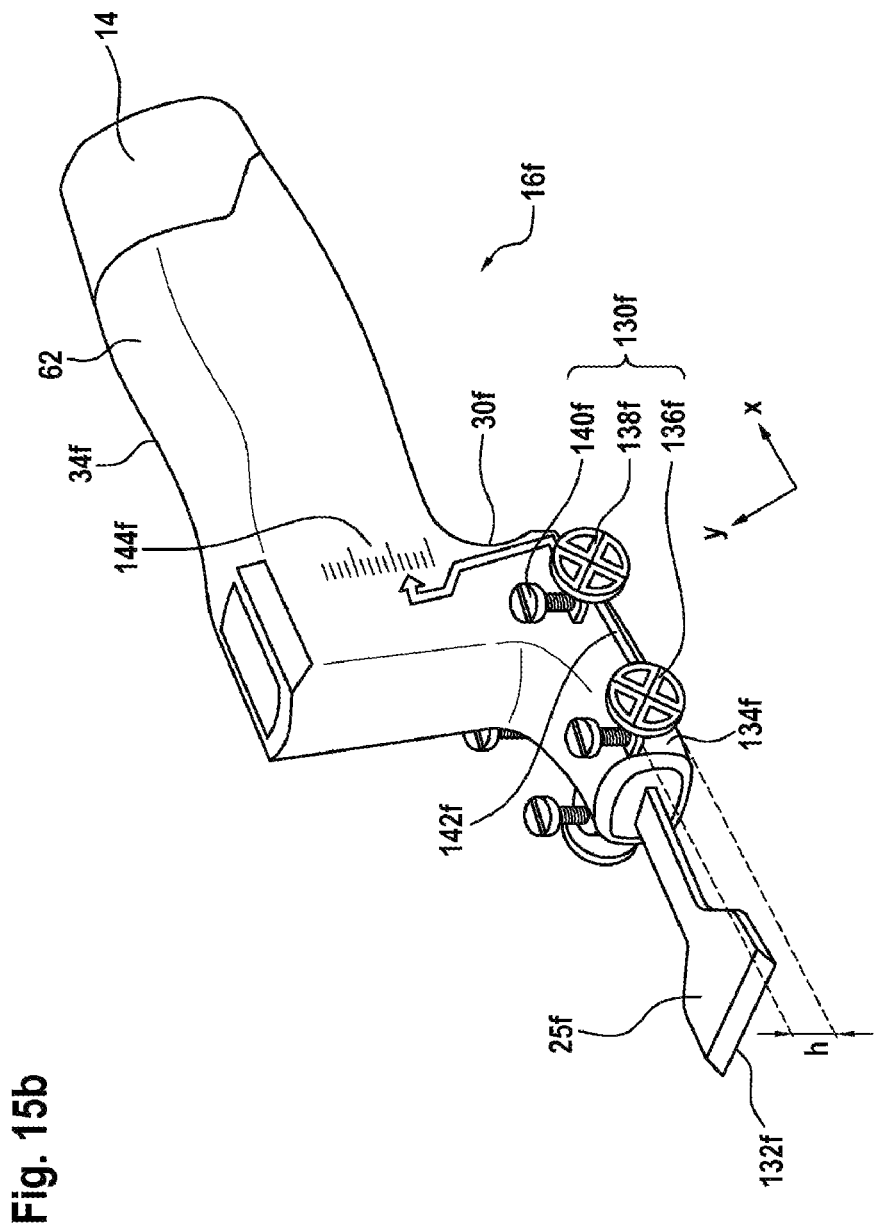
FIG. 15b shows a view of a further embodiment of the sixth hand-held power tool according to the disclosure in a schematic representation.

FIG. 15b shows an embodiment of an electric scraper 16f with a device 130f for adjusting and/or fixing a height h. The device 130f is arranged on the first housing part 34f. The height h here is the distance between a working end 132f of the machining tool 25f and an imaginary extension line, which runs along a lower housing wall 134f of the first housing part 30f in the x direction of the electric scraper 16f. The machining tool 25f is guided and fixed with respect to the height h, so that the machining tool 25f can penetrate into a work material, while limited to a predetermined cutting depth. The device 130f comprises at least one first height adjusting means 136f and a second height adjusting means 138f. The height adjusting means 136f, 138f can be adjusted and fixed by means of at least one height-adjustable fastening means 140f. The first height adjusting means 136f and the second height adjusting means 138f are connected to one another by way of an axis 142f. A reading unit 144f serves for indicating the cutting depth to the operator of the electric scraper 16f.

Figure 16:
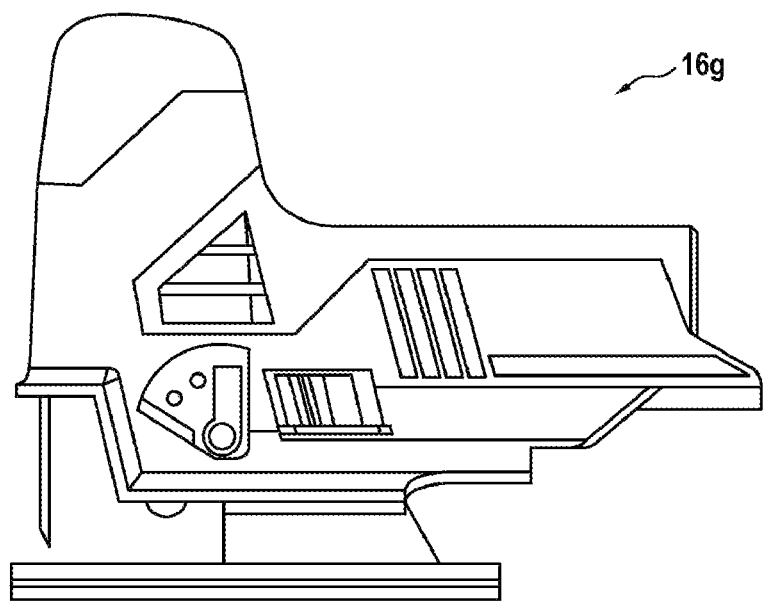
FIG. 16 shows a seventh hand-held power tool according to the disclosure in a schematic representation.

As evident in FIG. 16, the handheld power tool 16g is formed as a jigsaw 16g.

Figure 17:
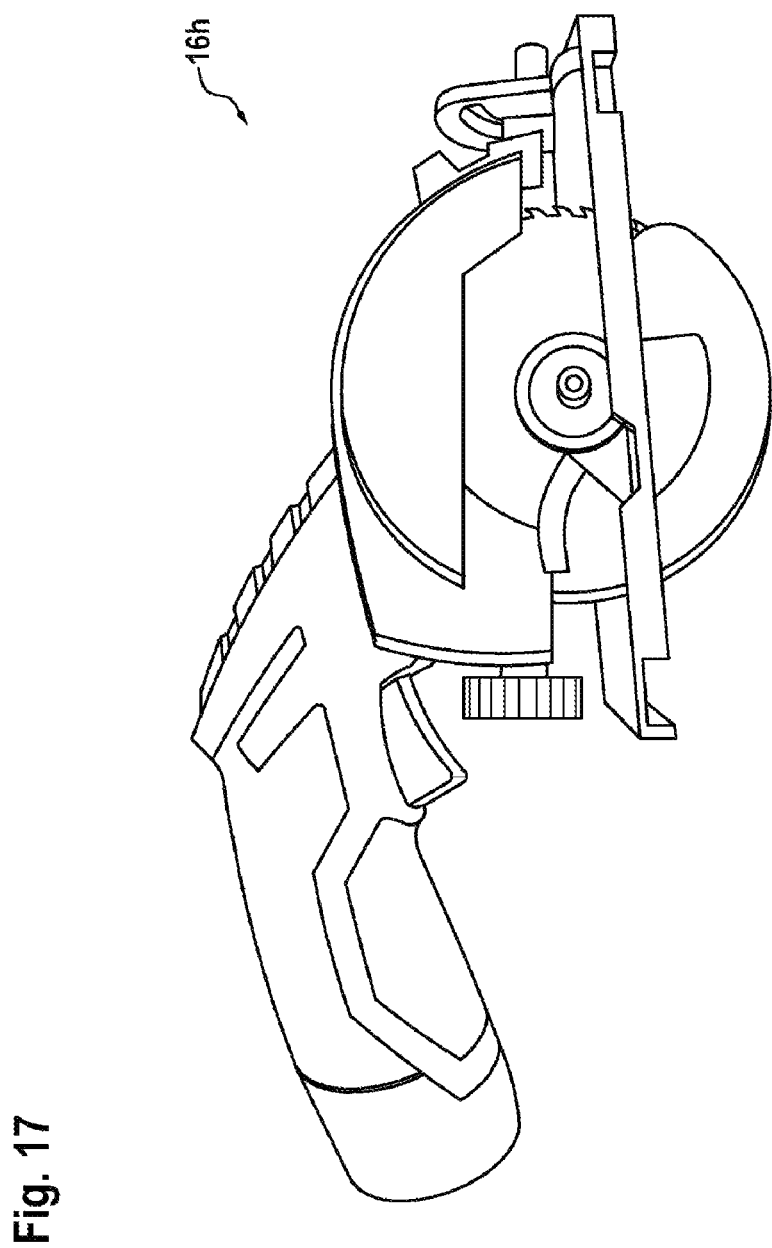
FIG. 17 shows an eighth hand-held power tool according to the disclosure in a schematic representation.

As evident in FIG. 17, the handheld power tool 16h is formed as a circular saw 16h.

Figure 18:
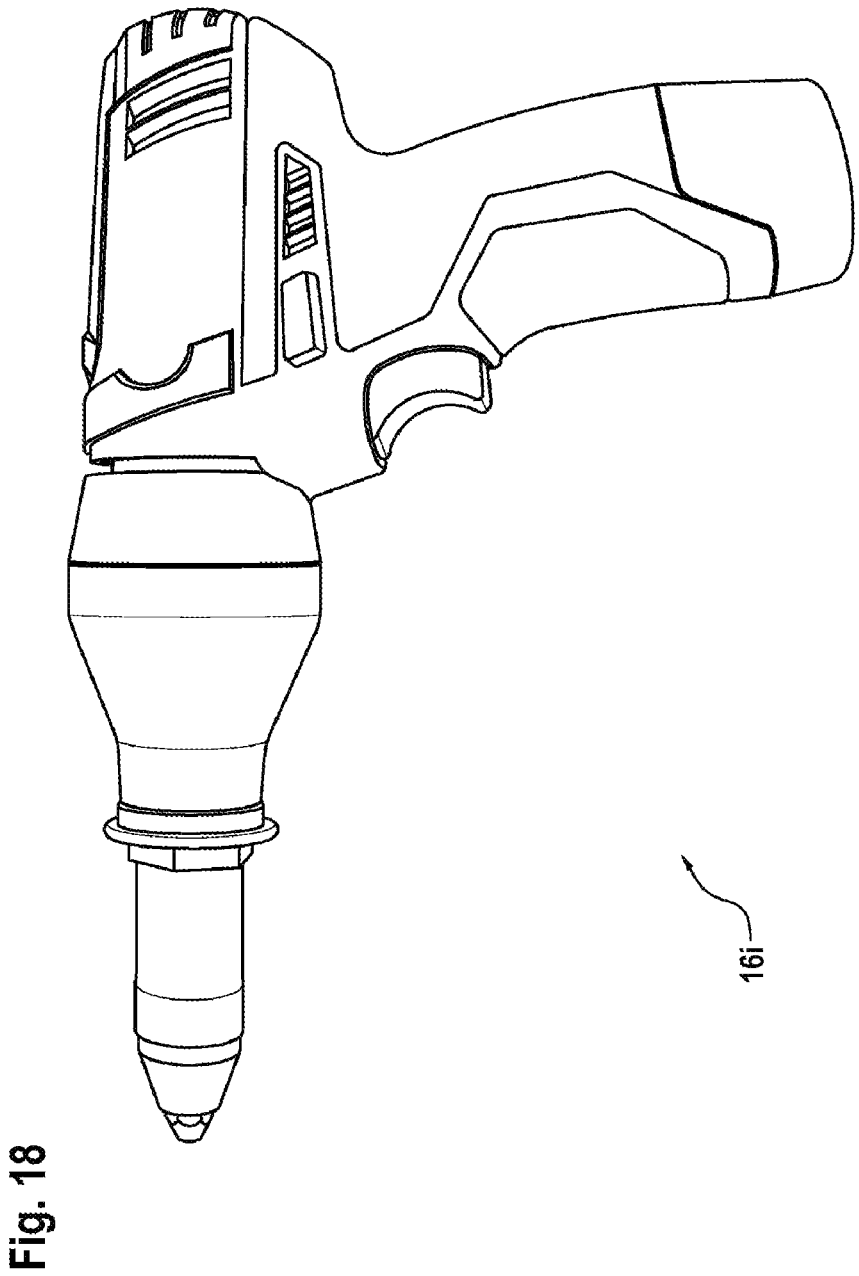
FIG. 18 shows a ninth hand-held power tool according to the disclosure in a schematic representation.

As evident in FIG. 18, the handheld power tool 16i is formed as a riveter 16i.

Figure 19:
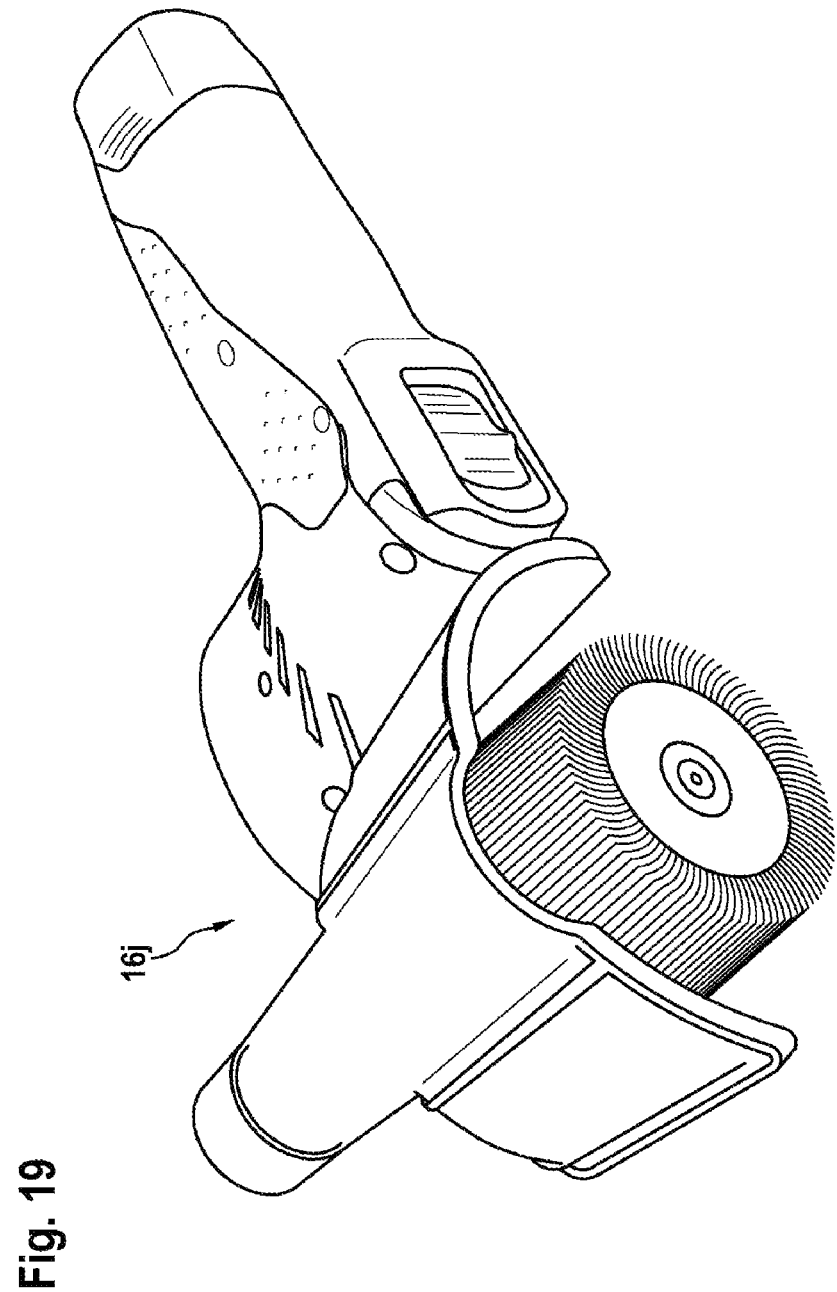
FIG. 19 shows a tenth hand-held power tool according to the disclosure in a schematic representation.

As evident in FIG. 19, the handheld power tool 16j is formed as a roller sander 16j.

The invention claimed is:

1. A system comprising:
   at least one rechargeable battery of a voltage class;
   at least one first hand-held power tool including:
      a tool housing,
      at least one first interface supported by the tool housing and configured to interface with the at least one rechargeable battery,
      at least one first electronically commutated electric motor of a first defined construction size, the at least one first electronically commutated electric motor supported by the tool housing and including an output shaft extending from a motor housing,
      at least one first electronic unit supported by the tool housing configured to control the first electronically commutated electric motor,
      at least one first switching element supported by the tool housing and configured to activate the first electronically commutated electric motor,
      a tool spindle rotatably supported by the tool housing configured to connect directly to a machining tool; and
   at least one second hand-held power tool of a type different than the at least one first hand-held power tool, the at least one second hand-held power tool including
      at least one second interface configured to interface with the at least one rechargeable battery,
      at least one second electronically commutated electric motor of a second defined construction size different from the first defined construction size,
      at least one second electronic unit configured to supply power to the second electronically commutated electric motor,
      at least one second switching element configured to activate the second electronically commutated electric motor,
   wherein the at least one rechargeable battery is configured to correspond both with the at least one first interface and with the at least one second interface,
   wherein the at least one first electronic unit is configured to connect to the at least one rechargeable battery and to monitor at least one parameter concerning the at least one rechargeable battery,
   wherein the at least one parameter includes a capacity of the at least one rechargeable battery, and
   wherein the output shaft defines a first axis coaxial in relation to a first spindle axis defined by the tool spindle, the output shaft configured to drive the tool spindle and the machining tool directly without a gear mechanism located between the tool spindle and the output shaft.

2. The system as claimed in claim 1, wherein:
   the first electronically commutated electric motor is accommodated by a first housing part of the first hand-held power tool, and
   the second electronically commutated electric motor is accommodated by a first housing part of the second hand-held power tool.

3. The system as claimed in claim 2, wherein the at least one first electronic unit is at least partially accommodated by a second housing part of the first handheld power tool and is arranged, at least in an x direction of the second housing part, at least partially between the at least one first interface and the first housing part.

4. The system as claimed in claim 3, wherein:
the at least one rechargeable battery is at least partially integrated in the second housing part,
the second housing part accommodates a large part of a battery length of the at least one rechargeable battery, and
the at least one rechargeable battery and the second housing part define a second axis coaxial in relation to a pushing-in direction of the at least one rechargeable battery.

5. The system as claimed in claim 4, wherein the first axis and the second axis are at an angle to one another that lies between 60° and 120°.

6. The system as claimed in claim 4, wherein the first axis and the second axis are at an angle to one another of 10° to 20°.

7. The system as claimed in claim 3, wherein:
the at least one rechargeable battery is at least partially arranged on the second housing part, a large part of a battery length of the at least one rechargeable battery located outside the second housing part,
the at least one rechargeable battery and the second housing part define a second common axis at an angle to a pushing-in direction of the at least one rechargeable battery, and
the large part is greater than 50% of the battery length.

8. The system as claimed in claim 3, wherein:
at least the second housing part is formed as a handle and/or serves as a handle, and
the at least one first interface and the at least one second interface are each mechanical interfaces.

9. The system as claimed in claim 3, wherein:
the at least one first switching element is arranged in the second housing part, and
the at least one first switching element is configured as a switching slide or as a dead man's switch.

10. The system as claimed in claim 2, wherein a length of the first housing part of the first hand-held power tool is 50 to 150 mm.

11. The system as claimed in claim 1, wherein:
the at least one first electronically commutated electric motor defines a length of 12 to 30 mm, and
the at least one first electronically commutated electric motor has a diameter of 30 to 50 mm.

12. The system as claimed in claim 11, wherein the at least one first electronically commutated electric motor has a rotor and a sensor element, which is configured to detect an angular position of the rotor.

13. The system as claimed in claim 1, wherein the at least one first electronically commutated electric motor has a length of 10 to 35 mm.

14. The system as claimed in claim 13, wherein the at least one first electronically commutated electric motor has a diameter of 40 to 60 mm.

15. The system as claimed in claim 1, wherein:
the at least one first electronic unit is connected to the at least one first electronically commutated electric motor,
the at least one first electronic unit is configured to monitor at least one parameter concerning the at least one first electronically commutated electric motor and/or to control the at least one parameter in a closed-loop manner, and
the at least one parameter is a rotational speed, a current, or a voltage of the at least one first electronically commutated electric motor.

16. The system as claimed in claim 1, wherein:
the at least one first electronic unit is connected to an internal switch,
the at least one first electronic unit is configured to monitor at least one parameter concerning the internal switch and/or to control the at least one parameter in a closed-loop manner, and
the at least one parameter includes a short-circuit current, which flows by way of a switching contact.

17. The system as claimed in claim 1, wherein:
the at least one first electronic unit is configured to connect to the at least one rechargeable battery and to monitor at least one parameter concerning the at least one rechargeable battery and/or to control the at least one parameter in a closed-loop manner, and
the at least one parameter includes an overload state of the at least one rechargeable battery.

18. The system as claimed in claim 1, wherein the at least one first hand-held power tool is operable in an energy-saving mode and/or in a boost mode.

19. The system as claimed in claim 1, wherein:
the output shaft is a first output shaft,
the tool spindle is a first tool spindle,
the at least one second hand-held power tool includes a second tool spindle,
the at least one second electronically commutated electric motor includes a second output shaft,
wherein the second output shaft defines a third axis non-coaxial in relation to a second spindle axis defined by the second tool spindle.

20. The system as claimed in claim 19, wherein the at least one second hand-held power tool includes a coupling element configured to transform a rotating movement of the second output shaft to an oscillating movement of the second tool spindle.

* * * * *